United States Patent
Chen et al.

(10) Patent No.: US 10,436,607 B2
(45) Date of Patent: Oct. 8, 2019

(54) MOTION SENSING USING HALL VOLTAGE SIGNALS

(71) Applicant: Apple Inc., Cupertino, CA (US)

(72) Inventors: Denis G. Chen, San Jose, CA (US); Arman Hajati, Santa Clara, CA (US); Manoj K. Bhattacharyya, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 15/674,227

(22) Filed: Aug. 10, 2017

(65) Prior Publication Data

US 2018/0080800 A1    Mar. 22, 2018

Related U.S. Application Data

(60) Provisional application No. 62/396,036, filed on Sep. 16, 2016, provisional application No. 62/482,166, filed on Apr. 5, 2017.

(51) Int. Cl.
*G01D 5/20* (2006.01)
*G01D 5/14* (2006.01)

(52) U.S. Cl.
CPC .......... *G01D 5/2013* (2013.01); *G01D 5/142* (2013.01); *G01D 5/145* (2013.01)

(58) Field of Classification Search
CPC ....... G01D 5/2013; G01D 5/145; G01D 5/142
USPC .......................................... 324/207.2; 440/6
See application file for complete search history.

(56) References Cited

U.S. PATENT DOCUMENTS

| | | | |
|---|---|---|---|
| 6,580,269 B2 | 6/2003 | Hiligsmann et al. | |
| 7,956,610 B2 | 6/2011 | Granig et al. | |
| 8,442,787 B2 | 5/2013 | Ausserlechner et al. | |
| 8,643,227 B2 | 2/2014 | Takeuchi | |
| 9,081,041 B2 | 7/2015 | Friedrich et al. | |
| 9,513,709 B2 | 12/2016 | Gregorio et al. | |
| 2009/0186535 A1* | 7/2009 | Sullivan ................ | B60F 3/0007 440/6 |
| 2010/0295138 A1 | 11/2010 | Montanya Silvestre et al. | |
| 2014/0062469 A1 | 3/2014 | Yang et al. | |
| 2016/0172136 A1 | 6/2016 | McGaffey et al. | |

* cited by examiner

*Primary Examiner* — Farhana A Hoque
(74) *Attorney, Agent, or Firm* — Fish & Richardson P.C.

(57) ABSTRACT

An integrated circuit (IC) chip including an array of asymmetrically distributed magnetic field sensing elements. Additionally, an integrated circuit (IC) chip includes a substrate, a sensing coil supported by the substrate and enclosing a portion of substrate, and a Hall effect sensor supported by the portion of the substrate enclosed by the sensing coil.

22 Claims, 17 Drawing Sheets

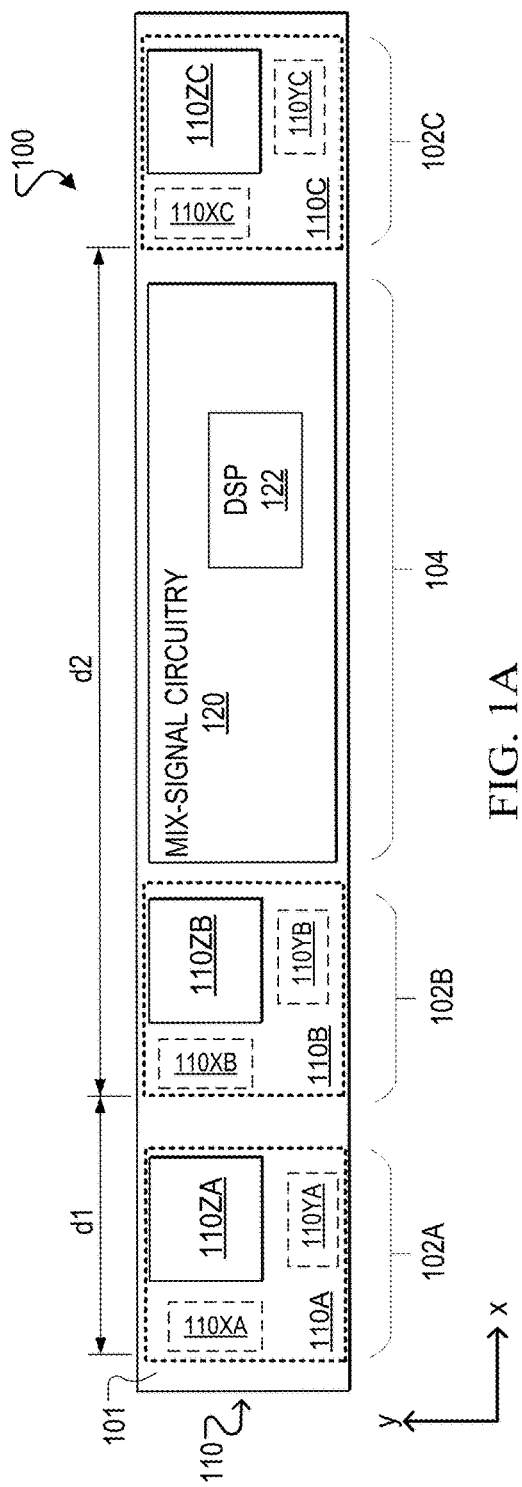
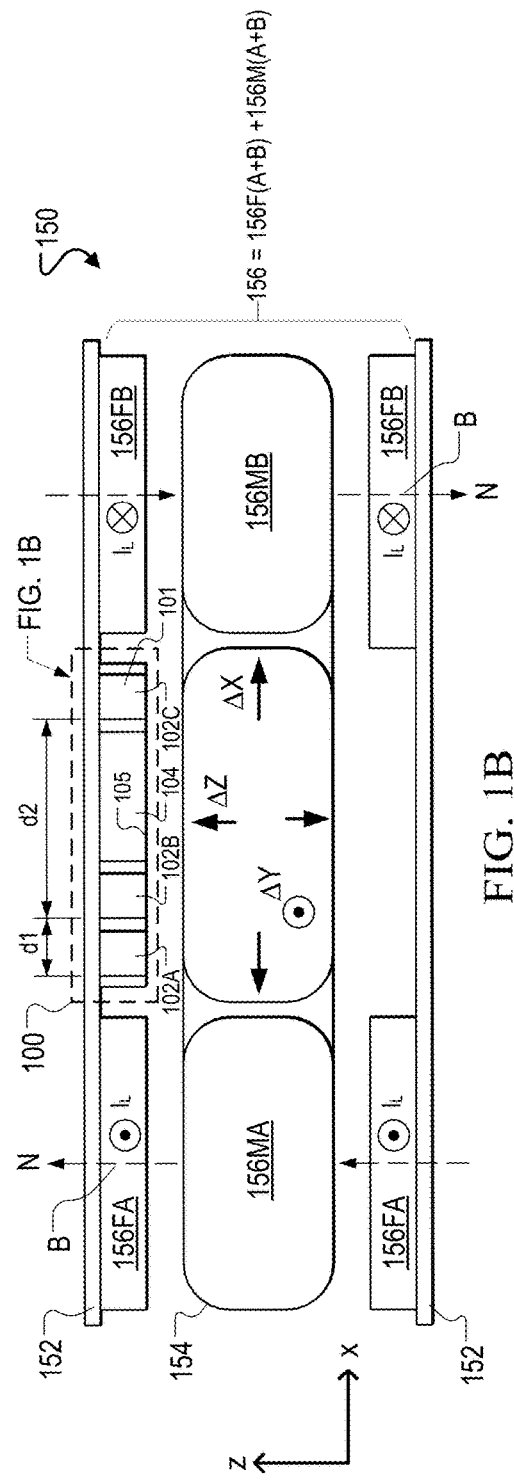
FIG. 1A
FIG. 1B

MOTION SENSING USING HALL VOLTAGE SIGNALS

CROSS-REFERENCE TO RELATED APPLICATIONS

This disclosure claims priority to U.S. Provisional Application Ser. No. 62/396,036, filed Sep. 16, 2016, the disclosure of which is incorporated herein by reference in its entirety. Further, this disclosure claims priority to U.S. Provisional Application Ser. No. 62/482,166, filed Apr. 5, 2017, the disclosure of which is incorporated herein by reference in its entirety.

TECHNICAL FIELD

The present disclosure is generally related to motion sensing. For example, aspects of the present disclosure are related to localizing a moving magnet using an array of asymmetrically distributed Hall-effect sensing elements. As another example, aspects of the present disclosure are related to localizing a moving magnet based on Hall voltage signals and back electromotive force (bEMF) signals that are concurrently acquired using a hybrid sensor that includes a Hall effect sensor (HES) and a sensing coil.

BACKGROUND

A haptic engine (also referred to as a vibration module) is a linear resonant actuator that determines one of acceleration, velocity and displacement of a moving mass. FIGS. 12A-12B show aspects of a conventional haptic engine (HE) in which position of a magnet (M), that is moving relative to a fixed coil (C), is encoded in the intensity of magnetic field flux and sensed by Hall-effect sensing elements (HSEs), also referred to interchangeably as HESs or simply Hall sensors, disposed on a top side of the coil, and on a bottom side of the coil. For example, a displacement $\Delta X$ along the x-axis and a displacement $\Delta Z$ along the z-axis of the magnet, that is moving relative to the fixed coil, is determined as:

$$\Delta X \propto V_{H_{top}} + V_{H_{btm}}, \quad (1)$$

$$\Delta Z \propto \frac{(V_{H_{top}} - V_{H_{btm}})}{\Delta X}, \quad (2)$$

where the magnetic field flux induces a Hall voltage $V_{Htop}$ in the Hall sensor disposed on the top side of the coil, and a Hall voltage $V_{Hbtm}$ in the Hall sensor disposed on the bottom side of the coil.

As another example, the displacement $\Delta X$ of the magnet along the x-axis can be obtained as:

$$\Delta X = LUT(V_H - \eta I) \quad (3),$$

where $V_H$ is voltage output by an HSE, I is a current through the driving coil C, and $\eta$ is an EM coupling factor. $V_H$ is proportional to a magnitude B of a total field caused by the magnet and induced by the driving coil, while $\eta I$ is proportional to a magnitude of a field induced by the driving coil. In EQ. (3), the difference represents the Hall voltage due to the field caused only by the magnet. LUT is a look-up table mapping the measured value of the field caused only by the magnet and a corresponding value of the displacement.

FIG. 12C shows examples of errors of the displacement measurements for various frequencies of driving currents. For driving currents having frequencies in the mid-frequency range, a sensing error can be caused by the inaccuracy of $\eta$. As such, a conventional HE needs an external reference displacement sensor (e.g., laser or bEMF model fitting, etc.) for calibration, as shown in FIG. 12C.

For instance, bEMF can be determined conventionally using the driving coil itself, in the following manner:

$$bEMF = V - RI - L\frac{dI}{dt} - R\tau_{ADC}\frac{dI}{dt}, \quad (4)$$

where R and L are the resistance and inductance, respectively, of the driving coil. Here, the first term is the voltage across the driving coil, the second term is a driver term, and the third term is an inductance term. However, as shown in EQ. (4), accuracy of bEMF-based motion sensing is prone to a number of error sources. The coil resistance R is very sensitive to temperature changes and quantization error associated with analog-to-digital conversion (ADC). Typically, copper's temperature coefficient of resistance is approximately 0.4%/deg C. This can represent a large error source when the engine is operating in power-limited regime (away from resonance frequency) where bEMF can be approximately 10% of the RI term. Similarly, when R is estimated in real-time with very small signal magnitude (typically a calibration tone in kHz range), the estimation itself is also prone to errors of 1 to 10%. Another error source in Eq. (4) is the timing synchronization between driving coil voltage V and driving coil current I when an ADC delay $\tau_{ADC}$ between the measured driving coil voltage V and measured driving coil current I is finite (i.e., non-zero). As such, for driving currents having frequencies in a high-frequency range, a finite false inductance term, given by the fourth term in EQ. (4), can be sensed as part of bEMF, as shown in FIG. 12C. Such timing synchronization can be expressed as $$\tau_D + \tau_{ADC} \approx \frac{L + L_g}{R}, \quad (5)$$

where $\tau_D$ is the group delay between voltage and current caused by the inductance, and $L_E$ is the false inductance term caused by the ADC group delay.

Further, large offsets of the magnet's cage relative to one side of the HE's housing can produce dead-zones in displacement sensitivity, as shown in FIG. 12D. Furthermore, the conventional HE can be sensitive to temperature change. At least for the above reasons, the conventional HE shown in FIGS. 12A-12B requires external calibration, however, module to system test correlations can be elusive.

SUMMARY

In this disclosure, technologies are described for measuring displacements of a moving mass, which is part of a magnetic field source, by using an array of asymmetrically distributed magnetic field sensing elements. Other technologies described in this disclosure are directed to localizing a moving magnet based on Hall voltage signals and bEMF signals concurrently acquired using a hybrid sensor that includes a HES and a sensing coil. Here, the magnetic field sensing elements can be Hall-effect sensing elements fabricated, using CMOS technologies, as part of an integrated circuit chip. As such, the array of asymmetrically distributed Hall-effect sensing elements or the hybrid sensor along with driving circuitry, conditioning circuitry and processing circuitry can be integrated in an application specific integrated circuit (ASIC).

One aspect of the disclosure can be implemented as an integrated circuit (IC) chip that includes a first magnetic field sensing element disposed at a first location of the IC chip; a second magnetic field sensing element disposed at a second location of the IC chip; and a third magnetic field sensing element disposed at a third location of the IC chip, the first location, the second location and the third location being distributed along a first direction, such that the second location is between the first location and the third location, and the second location is separated from the first location by a first distance and from the third location by a second distance different from the first distance; and signal processing circuit configured to determine displacements of a mass, when the mass is in motion along a direction of motion having a first component along the first direction and a second component along a second direction normal to the IC chip, where the mass supports at least a portion of a magnetic field source, and where the displacements of the mass are determined, at least in part, based on location-specific changes of a magnetic field emitted by the magnetic field source, the magnetic field changes being caused by the motion of the mass.

Implementations can include one or more of the following features. In some implementations, the location specific magnetic field changes can include magnetic field changes sensed at the first location by the first magnetic field sensing element, magnetic field changes sensed at the second location by the second magnetic field sensing element, and magnetic field changes sensed at the third location by the third magnetic field sensing element. In some implementations, the signal processing circuit can be disposed in an area of the IC chip that is between the second location and third location along the first direction, and the second distance is larger than the first distance.

In some implementations, the determined displacements of the mass can include a displacement $\Delta X$ along the first direction (e.g., the x-axis) and a displacement $\Delta Z$ along the second direction (e.g., the z-axis). In some cases, each of the first, second and third magnetic field sensing elements can be configured to sense a component of the magnetic field along the second direction. For example, each of the first, second and third magnetic field sensing elements can include a uniaxial Hall-effect sensor element. In some cases, each of the first, second and third magnetic field sensing elements is configured to (i) sense components of the magnetic field along each of the first direction, the second direction and a third direction orthogonal on both the first direction and the second direction, and (ii) provide to the signal processing circuit an angle of the magnetic field relative to the second direction and a magnitude of the magnetic field. For example, each of the first, second and third magnetic field sensing elements can include a tri-axial Hall-effect sensor element.

In some cases, the IC chip can include a fourth magnetic field sensing element disposed at a fourth location of the IC chip, the fourth location being separated from the first location by a third distance along a third direction orthogonal on both the first direction and the second direction. Here, the direction of motion has a third component along the third direction, and the determined displacements of the mass further include a displacement $\Delta Y$ along the third direction (e.g., the y-axis). Further, the IC chip can include a fifth magnetic field sensing element disposed at a fifth location of the IC chip, the fifth location being separated from the third location by the third distance along the third direction and from the fourth location by a sum of the first distance and second distance along the first direction.

Furthermore, the IC chip can include a sixth magnetic field sensing element disposed at a sixth location of the IC chip, the sixth location being (i) between the fourth location and the fifth location, (ii) separated from the fourth location by the first distance along the first direction, and (iii) separated from the second location by the third distance along the third direction; a seventh magnetic field sensing element disposed at a seventh location of the IC chip, such that the third location is between the second location and the seventh location, where the seventh location is separated from the third location by the first distance along the first direction; and an eighth magnetic field sensing element disposed at an eighth location of the IC chip such that the fifth location is between the sixth location and the seventh eighth, where the eighth location is separated from the fifth location by the first distance along the first direction, and separated from the seventh location by the third distance along the third direction. Here, the magnetic field sensing elements provide to the signal processing circuit a gradient along the first direction of the gradient along the first direction of the magnetic field, e.g., $\delta^2 B_z/\delta X^2$.

In some implementations, the IC chip can include one or more driving circuits each of which includes a programmable current source; two or more of the magnetic field sensing elements; and a dummy load connected to each other in series. Additionally, the IC chip can include a band-gap reference circuit; sample and hold circuits; and for each of the driving circuits, (i) a multiplexer circuit including input ports and an output port, where an output of each of the magnetic field sensing elements, the dummies and the band-gap reference circuit is coupled with a respective input port of the multiplexer through a respective sample and hold circuit; (ii) a programmable gain amplifier circuit coupled with the output port of the multiplexer circuit; and (iii) an analog to digital converter (ADC) circuit coupled between the programmable gain amplifier circuit and the signal processing circuit. In some cases, the IC chip can include a chopping multiplexer pair coupled between the output port of the multiplexer circuit and the input of the programmable gain amplifier circuit and between the output of the programmable gain amplifier circuit and the input of the ADC circuit. In some cases, the signal processing circuit and one or more of the dummy loads, the band-gap reference circuit, sample and hold circuits, multiplexer circuits, programmable gain amplifier circuits and ADCs are disposed in a central area of the IC chip that is between the second location and third location along the first direction, and the second distance is larger than the first distance.

In some implementations, the signal processing circuit can determine, when the mass is at rest, a gradient of the magnetic field along the first direction based on (i) a value of the magnetic field sensed by the first magnetic field sensing element at the first location, (ii) a value of the magnetic field sensed by the second magnetic field sensing element at the second location, and (iii) the first distance between the first location and the second location. As such, the displacements of the mass are determined based on a combination of the location-specific changes of the magnetic field and the gradient of the magnetic field along the first direction.

In some implementations, the signal processing circuit can include a microcontroller unit. In some implementations, the signal processing circuit can include a Field- Programmable Gate Array. In some implementations, the IC chip can be an application specific IC (ASIC).

Another aspect of the disclosure can be implemented as a haptic engine that includes the mass and the above-summarized IC chip.

Another aspect of the disclosure can be implemented as a computing device that includes the haptic engine.

Another aspect of the disclosure can be implemented as a displacement measurement system that includes a substrate; a first magnetic field sensing element disposed at a first location of the substrate; a second magnetic field sensing element disposed at a second location of the substrate; and a third magnetic field sensing element disposed at a third location of the substrate, the first location, the second location and the third location being distributed along a first direction, such that the second location is between the first location and the third location, and the second location is separated from the first location by a first distance and from the third location by a second distance larger than the first distance by a predetermined factor; and signal processing circuit configured to determine displacements of a mass, when the mass is in motion along a direction of motion having a first component along the first direction and a second component along a second direction normal to the IC chip, where the mass supports at least a portion of a magnetic field source, and where the displacements of the mass are determined, at least in part, based on location-specific changes of a magnetic field emitted by the magnetic field source, the magnetic field changes being caused by the motion of the mass.

Implementations can include one or more of the following features. In some implementations, the predetermined factor can be a range of 1.1 to 10. In some implementations, the signal processing circuit can be disposed in an area of the substrate that is between the second location and third location along the first direction. In some implementations, the substrate, the first magnetic field sensing element, the second magnetic field sensing element, and the third magnetic field sensing element can be included in an integrated circuit chip. In some implementations, the substrate is a PCB board; and the first magnetic field sensing element is formed on a first chip, the second magnetic field sensing element is formed on a second chip, and the third magnetic field sensing element is formed on a third chip.

The above-disclosed technologies can result in one or more of the following potential advantages. For example, the array of asymmetrically distributed HSEs can measure ΔX, ΔY and ΔZ at the same time, can measure rotation around X, Y, and Z axes, and can differentiate rotational motion from translational motion.

As another example, the array of asymmetrically distributed magnetic field sensing elements can be placed closer to the magnetic field source of the haptic engine and away from potential dead-zones, compared to the HSEs used in the conventional haptic engine in FIGS. 12A-12B. As yet another example, unlike the HSEs used in the conventional haptic engine in FIGS. 12A-12B that require calibration based on an external reference displacement sensor, the array of asymmetrically distributed magnetic field sensing elements can be self-calibrated. Also, the array of asymmetrically distributed magnetic field sensing elements is integrated in a single CMOS chip or SoC along with necessary driver circuitry, unlike the HSEs used in the conventional haptic engine in FIGS. 12A-12B that are driven with external circuitry.

Furthermore, as the array of asymmetrically distributed magnetic field sensing elements is integrated in a single CMOS chip or SoC, the chip can be disposed, as part of a haptic engine, on a single side of a magnetic field source. In contrast, the HSEs used in the conventional haptic engine in FIGS. 12A-12B are disposed, inside a conventional haptic engine, above and below the magnet, and for this reason, results of the displacement measurements taken with the two conventionally placed HSEs are sensitive to alignment of the HSEs.

The reason for the HSEs used in the conventional haptic engine in FIGS. 12A-2B to be placed above and below the magnet is to allow for results of ΔZ measurements to be insensitive to temperature. In contrast, ΔZ measurements can be performed with the array of asymmetrically distributed magnetic field sensing elements in a ratiometric manner, in which case results of the ΔZ measurements are intrinsically insensitive to temperature change.

Another aspect of the disclosure can be implemented as an integrated circuit (IC) chip that includes a substrate; a sensing coil supported by the substrate and enclosing a portion of substrate; and a Hall effect sensor (HES) supported by the portion of the substrate enclosed by the sensing coil.

Implementations can include one or more of the following features. In some implementations, when the IC chip is disposed within a varying magnetic field, the sensing coil outputs a bEMF signal proportional to a change of the magnetic field, and, concurrently, the HES outputs a Hall voltage signal proportional to a magnitude of the magnetic field.

In some implementations, the sensing coil can be shaped like a polygon. In some implementations, the sensing coil can be shaped like an oval. In some implementations, the HES can be supported at a center of symmetry of the sensing coil.

In some implementations, the IC chip can include a plurality of layers stacked on the substrate. In some cases, the sensing coil and the HES can be formed in the same layer of the plurality of layers. In some cases, the sensing coil and the HES can be formed on respective different layers of the plurality of layers.

In some implementations, the IC chip can include signal conditioning circuitry coupled with output terminals of the sensing coil and output terminals of the HES. In some implementations, the IC chip can further include analog-to-digital converter (ADC) circuitry. Here, input terminals of the ADC circuitry are coupled with output terminals of the signal conditioning circuitry. In some implementations, the IC chip can additionally include MUX circuitry coupled between the output terminals of the signal conditioning circuitry and the input terminals of the ADC circuitry. In some implementations, the IC chip can additionally include signal processing circuitry coupled with output terminals of the ADC circuitry. In some cases, the signal processing circuit can include a microcontroller unit. In some cases, the signal processing circuit can include a Field-Programmable Gate Array. In some cases, the IC chip can be an application specific IC (ASIC).

In some implementations, a haptic engine can include a driving coil; a mass supporting a magnet, the mass being movable relative to the driving coil; and any one of the foregoing implementations of the disclosed IC chip affixed to the driving coil. In some implementations, a computing device can include the foregoing haptic engine.

Another aspect of the disclosure can be implemented as a method that includes vibrating a magnet relative a first coil in response to driving a current through the first coil; concurrently measuring a bEMF signal using a second coil affixed to the first coil and a Hall voltage signal using a Hall effect sensor (HES) disposed within the second coil; and determining a velocity of the vibrating magnet by using a sensing matrix and the concurrently measured bEMF signal and Hall voltage signal.

Implementations can include one or more of the following features. In some implementations, an inverse of the sensing matrix maps the concurrently measured bEMF signal and Hall voltage signal to the velocity of the vibrating magnet and a rate of the driving current through the first coil. Here, the method can further include determining the rate of the driving current concurrently with the determining of the velocity.

In some implementations, the method can further include verifying that the determined rate of the driving current exceeds a threshold; and adjusting one or more elements of the sensing matrix in response to the verifying. In some implementations, the method can further include measuring the driving current concurrently with the measuring of the bEMF signal and the Hall voltage signal; determining a rate of the measured driving current by differentiating the measured driving current; verifying that the determined rate of the driving current is different from the rate of the measured driving current by a threshold; and adjusting one or more elements of the sensing matrix in response to the verifying. In either of these implementations, the adjusting can include applying a filter on the one or more elements of the sensing matrix. For example, the applying of a filter can include performing a running average of the one or more elements of the sensing matrix.

Yet another aspect of the disclosure can be implemented as a displacement measurement system that includes (i) a haptic engine that includes a) a first coil, b) a mass supporting a magnet, the mass being movable relative to the first coil, and c) a hybrid sensor affixed to the first coil. The hybrid sensor includes (I) a substrate, (II) a second coil disposed on the substrate and enclosing a portion of substrate, and (III) a Hall effect sensor (HES) element disposed on the portion of the substrate enclosed by the second coil. Additionally, the displacement measurement system includes (ii) a digital signal processor (DSP) configured to determine displacements of the mass based on a bEMF signal and a Hall voltage signal induced in the second coil and in the HES, respectively, due to magnetic field changes caused by motion of the mass when a driving current is being driven through the first coil.

Implementations can include one or more of the following features. In some implementations, the hybrid sensor can be an IC chip. For example, the hybrid sensor can be an ASIC with the DSP formed on the IC chip.

In some implementations, the substrate can be a PCB board, and the HES can be formed on a chip. Here, the chip is connected to a socket of the PCB board disposed on the portion of the PCB board enclosed by the second coil. Further, the DSP can be disposed on the PCB board.

In some implementations, the displacement measurement system can include a plurality of the hybrid sensors c) affixed to the first coil, Here, the DSP can be configured to determine the displacement of the mass based on the bEMF signal and the Hall voltage signal output by each of the plurality of the hybrid sensors c). In some cases, the plurality of the hybrid sensors c) can form a 1D array. In some cases, the plurality of the hybrid sensors c) can form a 2D array.

The above-disclosed technologies can result in one or more of the following potential advantages. For example, by using the disclosed hybrid sensors, the above noted EM coupling factor η-accuracy errors in the Hall voltage measurements and the errors in bEMF measurements caused by resistance estimation and the finite ADC delay $\tau_{ADC}$ can be addressed concurrently. As such, when the disclosed technologies are used in combination with a closed loop controller of HE, the improvements in the foregoing error sources can improve the controller's performance, as shown in FIGS. 11B-11C. For instance, command-to-displacement transfer function (CDTF) bandwidth increases when accuracy of the EM coupling factor η increases. CDTF describes the transfer function between an input displacement command to a close-loop controlled HE and an output displacement (i.e., the actual movement of HE). A wider bandwidth in CDTF means HE can support a richer set of haptic vocabularies with greater fidelity.

Furthermore, bEMF is prone to timing error (τADC) between driving coil voltage and driving coil current measurements, as these are typically a small calibration tone on the order of 100 mV at 2 kHz superimposed on top of an engine drive signal on the order of 6.6 V at frequencies lower than 400 Hz. As shown in Table 1, the disclosed motion sensing technologies can be rendered accurate because the timing errors are constrained to values of 1 μs or less.

TABLE 1

| $\tau_{ADC}$ | −2 μs | 0 | +2 μs |
|---|---|---|---|
| R | 8.29 | 8.24 | 8.18 |
| L | 93.33 | 109.87 | 126.3 |

Here, R and L are the resistance and inductance, respectively, of the driving coil.

As such, measuring, based on the disclosed technologies, displacement of a moving mass inside a haptic engine can be used to avoid crash of the mass, minimize saliency variation over population, and improve reliability of the haptic engine.

Details of one or more implementations of the disclosed technologies are set forth in the accompanying drawings and the description below. Other features, aspects, descriptions and potential advantages will become apparent from the description, the drawings and the claims.

BRIEF DESCRIPTION OF THE DRAWINGS

FIG. 1A shows an example of an IC chip including an array of asymmetrically distributed magnetic field sensing elements.

FIG. 1B shows an example of a haptic system that has an IC chip including an array of asymmetrically distributed magnetic field sensing elements.

Figure 1C:
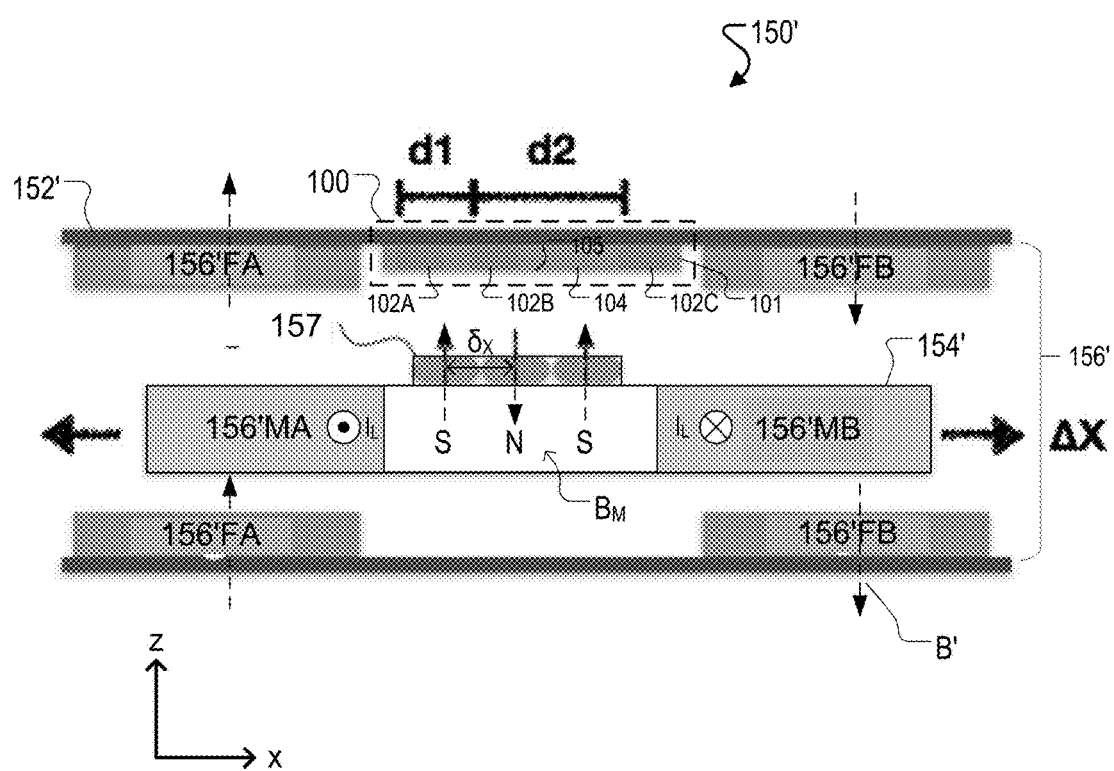
FIG. 1C shows another example of a haptic system that has an IC chip including an array of asymmetrically distributed magnetic field sensing elements.

Certain illustrative aspects of the systems, apparatuses, and methods according to the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

FIG. 1A is a plan view, e.g., in the (x,y) plane, of an example of an integrated circuit (IC) chip 100 that includes an array 110 of magnetic field sensing elements and mix-signal circuitry 120 formed on a die 101. The magnetic field sensing elements of the array 110 are distributed on the die 101 along a first direction, e.g., along the x-axis, at locations 102A, 102B, 102C, for instance. In this example, the mix-signal circuitry 120 is disposed in a central area 104 of the die 101 that separates, along the x-axis, the second location 102B from the third location 102C. As such, the second distance $d_2$ is larger than the first distance $d_1$, and the magnetic field sensing elements of the array 110 are said to be asymmetrically distributed along the x-axis.

FIG. 1B is a side view, e.g. in the (x,z) plane, of a portion of an example implementation of a haptic engine 150 that has a frame 152. The haptic engine 150 includes, encapsulated inside the frame 152, a mass 154, a magnetic field source 156 and the IC chip 100 shown in FIG. 1A. Here, the mass 154 can move relative to the frame 152 along the x-axis (e.g., through vibration left-and-right on page), along the z-axis (e.g., through vibration up-and-down on page), along the y-axis (e.g., through vibration in-and-out of page), or combinations of two or all three of these motions. The magnetic field source 156 includes portions 156F that are disposed on (i.e., are "fixed" to) the frame 152, e.g., coils, etc. As such, these are referred to as the fixed portions 156F of the magnetic field source. In some implementations, coil sections 156FA and 156FB can be made from one winding (looped in and out of the page) and have continuous current flow. The magnetic field source 156 also includes portions 156M that are part of the mass 154, e.g., permanent magnets, etc. As these move along with the mass 154, they are referred to as the mobile (or moving) portions 156M of the magnetic field source. For example, the mass 154 can be formed from a stainless steel cage with enclosures in which the mobile portions 156M of the magnetic field source are held. In this example, a value of the mass 154 is a sum of a mass of all the mobile portions 156M of the magnetic field source (e.g., the total mass of the mobile permanent magnets) and a mass of the stainless steel cage that holds them.

In the example illustrated in FIG. 1B, a left magnet 156MA is oriented with its north pole towards the top of the page and its south pole towards the bottom of the page, and a right magnet 156MB is oriented with its north pole towards the bottom of the page and its south pole towards the top of the page. Coil sections 156FA have the same electrical current flow (e.g., current $I_L$), while coil sections 156FB have the opposite electrical current flow (e.g., current $I_L$). For instance, when coil sections 156FA have current flowing out of the page and coil sections 156FB have current flowing into the page (as shown in FIG. 1B), the coil 156F experiences a Lorentz force to the left of the page and the magnets 156M, along with the mass 154, will move towards the right of the page. In this manner, an alternating current $I_L$ that is provided through the coil 156F causes a periodic Lorentz force that drives, along the x-axis, the mass 154 which includes the magnets 156M. An amplitude and frequency of the displacement $\Delta X$ of the mass 154 is proportional to respective amplitude and frequency of the coil current $I_L$.

The fixed portions 156F and the mobile portions 156M of the magnetic field source are configured and arranged relative to each other, such that, when the mass 154 is at rest, the magnetic field source 156 as a whole emits a magnetic field B. Only two lines of a spatial distribution of the magnetic field B(X,Y,Z) emitted by the magnetic field source 156 is shown in FIG. 1B, however, more details of the spatial distribution of the magnetic field B(X,Y,Z) emitted by the magnetic field source 156 will be illustrated in FIGS. 2A, 3A-3B. Moreover, the IC chip 100 is disposed on (i.e., is "fixed" to) the frame 152 of the haptic engine 150 in a sensing plane 105 of the spatial distribution of the magnetic field B(X,Y,Z) emitted by the magnetic field source 156. In this manner, each of the magnetic field sensing elements of the array 110 can determine one or more components of the magnetic field B, in the sensing plane 105, at the respective locations 102A, 102B, 102C. Note that in this configuration of the haptic engine 150, the fixed portions 156F and the mobile portions 156M of the magnetic field source are used both for driving the mass 154 along the x-axis and for sensing the mass' displacement $\Delta X$ along the x-axis, $\Delta Z$ along the z-axis, and $\Delta Y$ along the y-axis, as explained below.

FIG. 1C is a side view, e.g. in the (x,z) plane, of a portion of another example implementation of a haptic engine 150' that has a frame 152'. The haptic engine 150' includes, encapsulated inside the frame 152', a mass 154', a magnetic field source 156' and the IC chip 100 shown in FIG. 1A. Here, the mass 154' can move relative to the frame 152' along the x-axis (e.g., through vibration left-and-right on page), along the z-axis (e.g., through vibration up-and-down on page), along the y-axis (e.g., through vibration in-and-out of page), or combinations of two or all three of these motions. The magnetic field source 156' includes portions 156'F that are disposed on (i.e., are "fixed") to the frame 152', in this case, permanent magnets. As such, these are referred to as the fixed portions 156'F of the magnetic field source. The magnetic field source 156' also includes portions 156'M that are part of the mass 154', in this case, portions of a coil. As these move along with the mass 154', they are referred to as the mobile (or moving) portions 156'M of the magnetic field source. In some implementations, coil sections 156'MA and 156'MB can be made from one winding (looped in and out of the page) and have continuous current flow. For example, the mass 154' can be formed from a stainless steel cage with enclosures in which the mobile portions 156'M of the magnetic field source are held. Additionally, the magnetic field source 156' also includes a marker magnet set 157 that can be attached to the stainless steel cage, for instance. The marker magnet set 157 can include one or more permanent magnets arranged in accordance with a predetermined pattern in the (x,y) plane. In the example shown in FIG. 1C, the permanent magnets of the marker magnet set 157 are arranged in a row in which adjacent ones have opposing polarities. In this manner, a value of the mass 154' is a sum of a mass of all the mobile portions 156'M of the magnetic field source (e.g., the mass of the portions of the mobile coil together with the mass of the marker magnet set 157) and a mass of the stainless steel cage that holds them.

In the example illustrated in FIG. 1C, magnets 156'FA on the left side are oriented with their north pole towards the top of the page and their south pole towards the bottom of the page, and magnets 156'FB on the right side are oriented with their north pole towards the bottom of the page and their south pole towards the top of the page. Coil section 156'MA and coil section 156'MB have opposite respective electrical current flows (e.g., currents $I_L$). For instance, when coil section 156'MA has current $I_L$ flowing out of the page and coil section 156'MB has current $I_L$ flowing into the page (as shown in FIG. 1C), such that the coil 156'M experiences a Lorentz force to the left of the page and will move, along with the mass 154', towards the left of the page. In this manner, an alternating current $I_L$ that is provided through the coil 156'M causes a periodic Lorentz force that drives, along the x-axis, the mass 154' which includes the coil 156'M and the marker magnet set 157. An amplitude and frequency of the displacement $\Delta X$ of the mass 154' is proportional to respective amplitude and frequency of the coil current $I_L$.

The fixed portions 156'F and the mobile portions 156'M of the magnetic field source are configured and arranged relative to each other to emit, when the mass 154' is at rest, a magnetic field B'. Additionally, the marker magnet set 157 are configured to emit a marker magnetic field $B_M$ having a known spatial period $\delta_X$ between zero crossings thereof. Moreover, the IC chip 100 is disposed on (i.e., is "fixed" to) the frame 152' of the haptic engine 150' in a sensing plane 105' of the spatial distribution of the combined magnetic fields B'(X,Y,Z) and $B_M$(X,Y,Z) emitted by the magnetic field source 156 as a whole. Note that the marker magnet set 157 is spaced apart from the sensing plane 105' such that, at the sensing plane, a strength of the marker magnetic field $B_M$ emitted by the marker magnet set 157 is 10×, 100× or 100× stronger than a strength of the magnetic field B' emitted by the combination of permanent magnets 156'F and coil 156'M of the magnetic field source. In this manner, each of the magnetic field sensing elements of the array 110 can determine one or more components of the marker magnetic field $B_M$, in the sensing plane 105', at the respective locations 102A, 102B, 102C. Note that in this configuration of the haptic engine 150', the magnets 156'F and the coil 156'M of the magnetic field source are used for driving the mass 154' along the x-axis, and the marker magnet set 157 is used for sensing the mass' displacement $\Delta X$ along the x-axis, $\Delta Z$ along the z-axis, and $\Delta Y$ along the y-axis, as explained below.

Referring again to FIG. 1A, in some implementations, each magnetic field sensing element 110ZA, 110ZB, 110ZC is a single-axial magnetic field sensing element configured to measure, at its respective location 102A, 102B, 102C, a single component of a magnetic field B that is normal to the plane of the die 101, e.g., component $B_Z$ along the z-axis. In these cases, each of the single-axial magnetic field sensing elements 110ZA, 110ZB, 110ZC can be a Hall-effect sensing element configured to measure the $B_Z$ component of a magnetic field B. In some implementations, each of the single-axial magnetic field sensing elements 110ZA, 110ZB, 110ZC can be either a magneto-resistor or a flux-gate. In some implementations, each magnetic field sensing element 110A, 110B, 110C is a tri-axial magnetic field sensing element configured to measure, at its respective location 102A, 102B, 102C, all three components $B_Z$, $B_X$ and $B_Y$ of a magnetic field B. For example, the tri-axial magnetic field sensing element 110A includes a combination of (i) a single-axial magnetic field sensing element 110ZA configured to measure, at its location 102A, a component $B_Z$ along the z-axis, (ii) a single-axial magnetic field sensing element 110XA configured to measure, at its location 102A, a component $B_X$ along the x-axis, and (iii) a single-axial magnetic field sensing element 110YA configured to measure component $B_Y$ along the y-axis. Here, each of the tri-axial magnetic field sensing elements 110A, 110B, 110C can be a tri-axial Hall-effect sensing element configured to measure the $B_Z$, $B_X$ and $B_Y$ components of a magnetic field B.

Figure 2A:
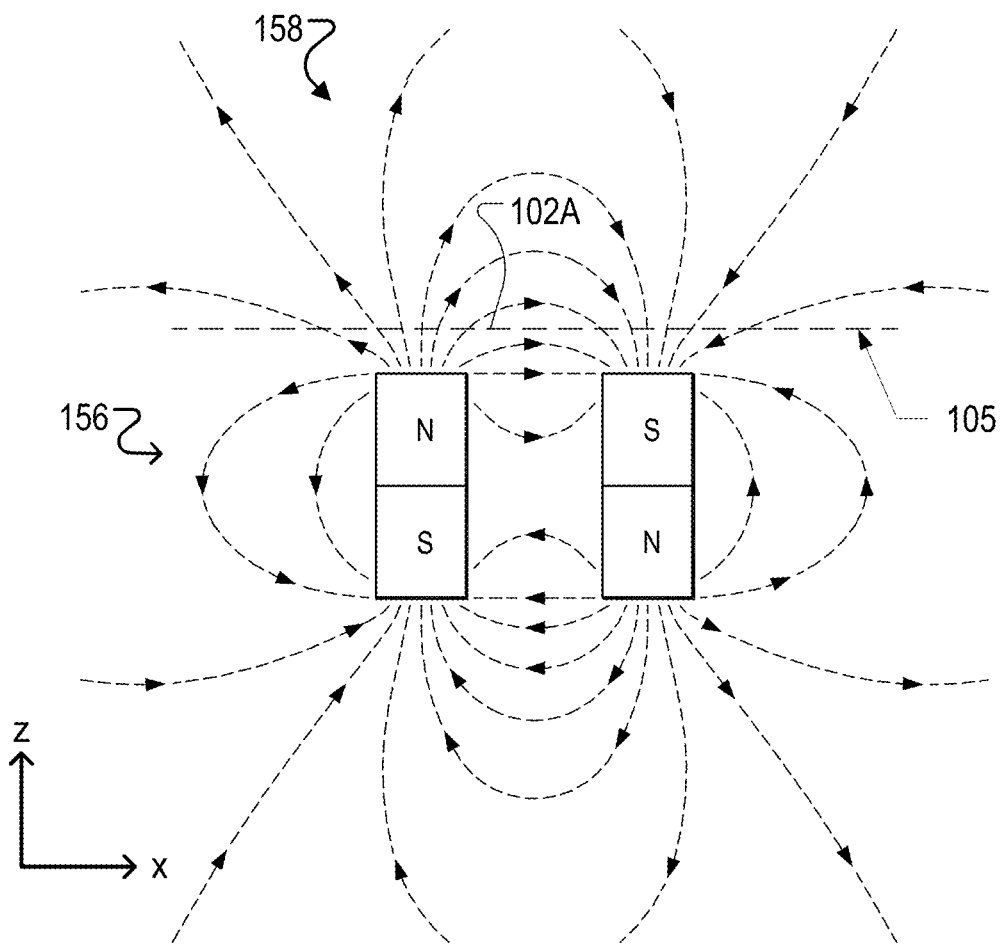
FIG. 2A shows an example of a spatial distribution of a magnetic field emitted by a magnetic field source of a haptic engine.
Figure 2B:
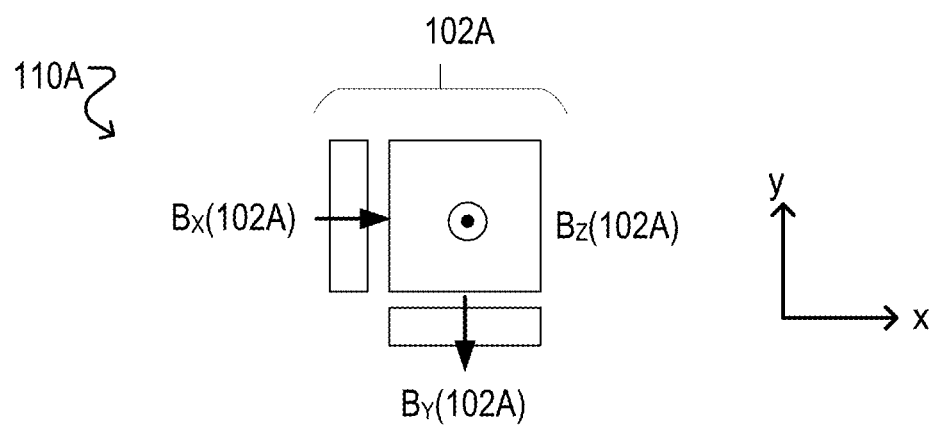
FIG. 2B shows components of a magnetic field sensed by a tri-axial Hall-effect sensing element.

FIG. 2A is a cross-section 158 in the plane (x,z) of a portion of an example of the spatial distribution of the magnetic field B(X,Y,Z) emitted by the magnetic field source 156. The sensing plane 105 also is overlaid, in FIG. 2A, on the (x,z) cross-section 158 of the spatial distribution of the magnetic field B(X,Y,Z). Note that, at a location 102A of the sensing plane 105, where one of the magnetic field sensing elements of the array 110 is disposed, the magnetic field B has non-zero $B_Z$, $B_X$ and $B_Y$ components. FIG. 2B shows components $B_Z$(102A), $B_X$(102A), $B_Y$(102A) of the magnetic field B measured at location 102A where the tri-axial Hall-effect sensing element 110A is located.

Figure 3A:
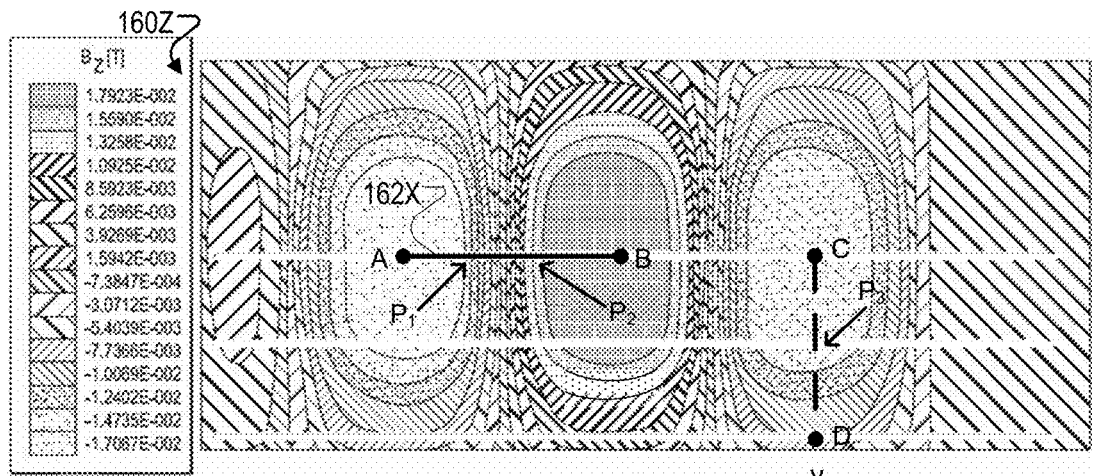
FIGS. 3A-3C show aspects of another example of a spatial distribution of a magnetic field emitted by a magnetic field source of a haptic engine.
Figure 3B:
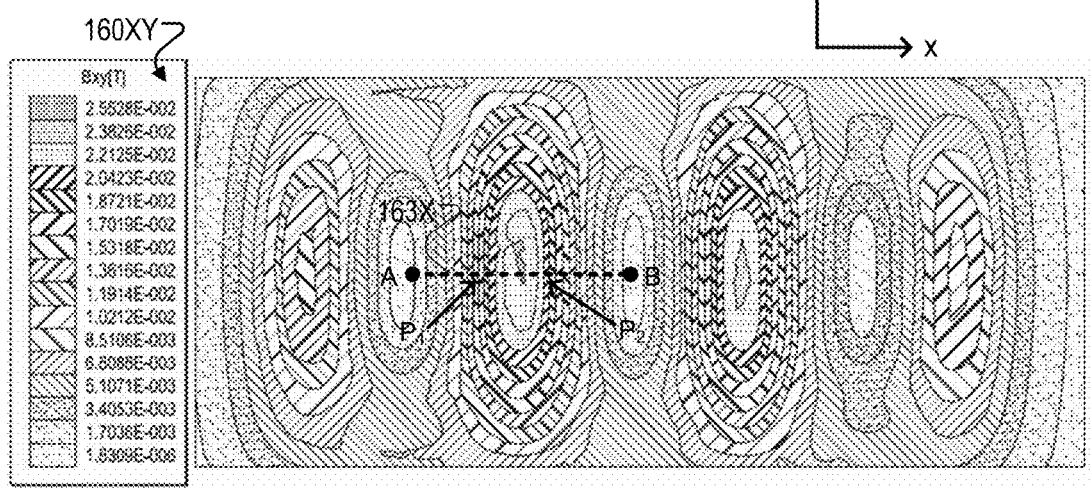

FIG. 3A is a representation of a spatial distribution 160Z of the axial component $B_Z$(X,Y) along the z-axis of the magnetic field B, measured in the sensing plane 105 (e.g., parallel to the (x,y) plane). FIG. 3B is a representation of a spatial distribution 160XY of the transverse component $B_{XY}$(X,Y) within the (x,y) plane of the magnetic field B, determined, e.g., by a digital signal processor 122 of the mix-signal circuitry 120, by using $$B_{XY}(X,Y) = \sqrt{B_X^2(X,Y) + B_Y^2(X,Y)} \qquad (6).$$

In EQ. 6, a component $B_X$(X,Y) along the x-axis and a component $B_Y$(X,Y) along the y-axis of the magnetic field B are measured concurrently with the component $B_Z$(X,Y), in the same sensing plane 105.

Figure 3C:
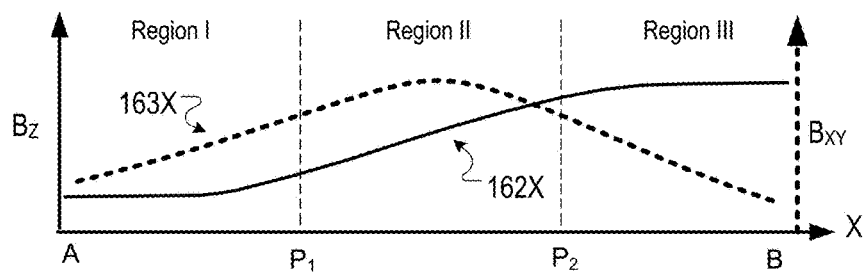

FIG. 3C shows a first cross-section 162X of the representation of the spatial distribution 160Z of the axial component $B_Z$(X,Y) and a second cross-section 163X of the representation of the spatial distribution 160XY of the transverse component $B_{XY}$(X,Y). Each of the cross-sections 162X, 163X corresponds to the segment AB parallel to the x-axis and spans a first region (denoted I) adjacent to first end point A, a second region (denoted II) between intermediate points P1, P2, and a third region (denoted III) adjacent to second end point B. The first cross-section 162X is linear in Region II, where it has large slope $\delta B_Z/\delta X$, and non-linear in each of Regions I, III, where it has nearly zero slope $\delta B_Z/\delta X$ but large curvature $\delta^2 B_Z/\delta X^2$. For these reasons, a measurement of the displacement $\Delta X$, performed based on the spatial distribution 160Z of the axial component $B_Z(X,Y)$, has highest sensitivity, that is proportional to $\delta B_Z/\delta X$, in Region II. In contrast, the sensitivity of the measurement of the displacement $\Delta X$, performed based on the same spatial distribution 160Z of the axial component $B_Z(X,Y)$, is proportional to $\delta^2 B_Z/\delta X^2$ in Region I and Region III. Moreover, the second cross-section 163X is linear in each of Regions I, III, where it has large slope $\delta B_{XY}/\delta X$, and non-linear in Region II, where it has nearly zero slope $\delta B_{XY}/\delta X$ but large curvature $\delta^2 B_{XY}/\delta X^2$. For these reasons, a measurement of the displacement $\Delta X$, performed based on the spatial distribution 160XY of the transverse component $B_{XY}(X,Y)$, has highest sensitivity, that is proportional to $\delta B_{XY}/\delta X$, in Region I and Region III. In contrast, the sensitivity of the measurement of the displacement $\Delta X$, performed based on the same spatial distribution 160XY of the transverse component $B_{XY}(X,Y)$, is proportional to $\delta^2 B_{XY}/\delta X^2$ in Region II.

Referring again to FIG. 3A, note that a third cross-section of the representation of the spatial distribution 160Z of the axial component $B_Z(X,Y)$, that corresponds to the segment CD parallel to the y-axis, is linear between intermediate point $P_3$ and end point D, where it has large slope $\delta B_Z/\delta Y$, and non-linear in between intermediate point $P_3$ and end point C, where it has nearly zero slope $\delta B_Z/\delta Y$ but large curvature $\delta^2 B_Z/\delta Y^2$. For this reason, a measurement of the displacement $\Delta Y$, performed based on the spatial distribution 160Z of the axial component $B_Z(X,Y)$, has highest sensitivity, that is proportional to $\delta B_Z/\delta Y$, point $P_3$ and end point D.

Referring now to FIG. 1B, motion of the mass 154, that includes at least one of a displacement $\Delta X$ along the x-axis, a displacement $\Delta Z$ along the z-axis, and a displacement $\Delta Y$ along the y-axis, causes rearrangement of the fixed portions 156FA, 156FB and mobile portions 156MA, 156MB of the magnetic field source with respect to each other. As such, the magnetic field B emitted by the magnetic field source 156 as a whole will change as its mobile portions 156MA, 156MB are moving, along with the mass 154, relative to its fixed portions 156FA, 156MB. In this manner, the magnetic field sensing elements of the array 110 will measure, at their respective asymmetrically distributed locations 102A, 102B, 102C in the sensing plane 105, the changes of the magnetic field B caused by the motion of the mass 154.

Additionally, the DSP 122 of the mix-signal circuitry 120 uses the changes of the magnetic field B, measured by the magnetic field sensing elements of the array 110 at their respective asymmetrically distributed locations 102A, 102B, 102C in the sensing plane 105, to determine one or more of the displacements $\Delta X$, $\Delta Z$, and $\Delta Y$ of the mass 154. In this manner, the displacements $\Delta X$, $\Delta Z$, and $\Delta Y$ of the mass 154 are determined by the DSP 122 with an accuracy corresponding to the accuracy of lithography processes used to establish/form the separations $d_1$ and $d_2$. Note that it is the asymmetric arrangement of the magnetic field sensing elements, in which the separations between adjacent magnetic field sensing elements are different, $d_2 \neq d_1$, that enables the DSP 122 to differentiate translational motion of the mass 154 along x, y, and z-axes, as described below. For instance, for the array 110, the separation $d_2$ between the magnetic field sensing elements 110B and 110C has to be larger than the separation $d_1$ between the magnetic field sensing elements 110A and 110B by at least 2%, 5% or 10%, so the displacements $\Delta X$, $\Delta Z$, and $\Delta Y$ are measurable in accordance with the techniques described herein. Typically, for the array 110, the separation $d_1$ between the magnetic field sensing elements 110A and 110B is in a range of 10-100 μm, and the separation $d_2$ between the magnetic field sensing elements 110B and 110C is suitably 2×-10× larger than $d_1$.

For example, the first magnetic field sensing element 110ZA measures the component $B_Z(102A)$ of the magnetic field at the first location 102A, and the second magnetic field sensing element 110ZB measures the component $B_Z(102B)$ of the magnetic field at the second location 102B. Here, $d_1$ is the separation along the x-axis between the first location 102A, where the first magnetic field sensing element 110ZA is located, and the second location 102B, where the second magnetic field sensing element 110ZB is located. Because the magnetic field B decays approximately linearly along the z-axis (given a separation along the z-axis between the sensing plane 105 and the adjacent surface of the stainless steel cage that encompasses mass 154 is at least 10× smaller than a separation along the x-axis between the mobile portions 156MA, 156MB of the magnetic field source), a displacement $\Delta Z$ along the z-axis and a displacement $\Delta X$ along the x-axis of the mass 154 induce a change of the component $\Delta B_Z(102A)$ at the first location 102A and a change of the component $\Delta B_Z(102B)$ at the second location 102A in accordance with the following system of two linear equations:

$$\begin{bmatrix} \Delta B_Z(102A) \\ \Delta B_Z(102B) \end{bmatrix} = \begin{bmatrix} \alpha B_Z(102A) & \frac{\delta B_Z(102A)}{\delta X} \\ \alpha\left(B_Z(102A) + d_1 \frac{\delta B_Z(102A)}{\delta X}\right) & \frac{\delta B_Z(102B)}{\delta X} \end{bmatrix} \begin{bmatrix} \Delta Z \\ \Delta X \end{bmatrix}. \quad (7)$$

The DSP 122 is configured to solve the above system of linear equations for the two unknown displacements $\Delta Z$, $\Delta X$ and unknown parameter a in terms of the measured changes $\Delta B_Z(102A)$ and $\Delta B_Z(102B)$. Note that, in view of the above noted linear approximation, the magnetic flux gradient satisfies the following first condition:

$$\frac{\delta B_Z(102A)}{\delta X} = \frac{\delta B_Z(102B)}{\delta X}. \quad (8)$$

Moreover, given that the first magnetic field sensing element 110ZA and the second magnetic field sensing element 110ZB are both calibrated in terms of a $\Delta Z$ correction, if the second magnetic field sensing element 110ZB measures, at the second location 102B at time t, a component $B_Z(102B;t)$ equal to the component $B_Z(102A;t-\tau)$ measured, at the first location 102A at an earlier time $t-\tau$, by the first magnetic field sensing element 110ZA, then the DSP 122 can infer, without having to perform a calibration based on an external displacement reference, that the mass 154 has traveled, over the time $\tau$, exactly the separation $d_1$ between the first and second magnetic field sensing elements. In such cases, the following second condition is satisfied:

If $B_Z(102A;t-\tau)=B_Z(102B;t)$, then $\Delta X=d_1$ \quad (9).

Figure 4A:
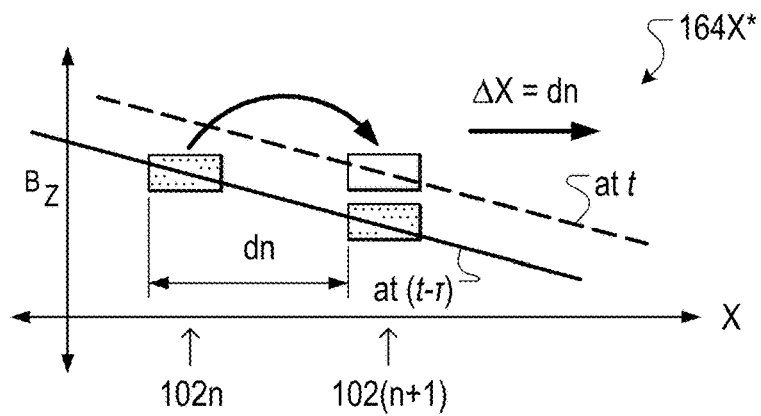
FIGS. 4A-4C show examples of changes of a magnetic field, that are caused by various displacements of a magnetic field source, as measured by asymmetrically distributed magnetic field sensing elements.

Note that, because the first magnetic field sensing element 110ZA and the second magnetic field sensing element 110ZB are typically at the same temperature, the determination of the displacement ΔX in accordance with EQ. 9 is temperature insensitive. Graph 164X* shown in FIG. 4A illustrates that the second condition from EQ. 9 can be used for self-calibration of the array 110 of magnetic field sensing elements by measuring the magnetic field component $B_Z(t-\tau)$ at a location 102n, and then measuring it again, as $B_Z(t)$, after a time τ at a different location 102(n+1) that is separated by a known separation $d_n$.

As such, the DSP 122 is configured to substitute EQs. 8-9 into the system of linear equations of EQ. 7 to determine the following displacement ΔZ along the z-axis:

$$\Delta Z \cong \frac{\Delta B_Z(102B) - \Delta B_Z(102A)}{\alpha d_1 \left( \frac{\Delta B_Z(102A)}{\delta X} \right)}. \quad (10)$$

Note that equations EQs. 7-10 can be generalized to account for the remaining magnetic field sensing elements of the array 110, e.g., the third magnetic field sensing element 110ZC that is separated from the second magnetic field sensing element 110ZB by separation $d_2$.

Figure 4B:
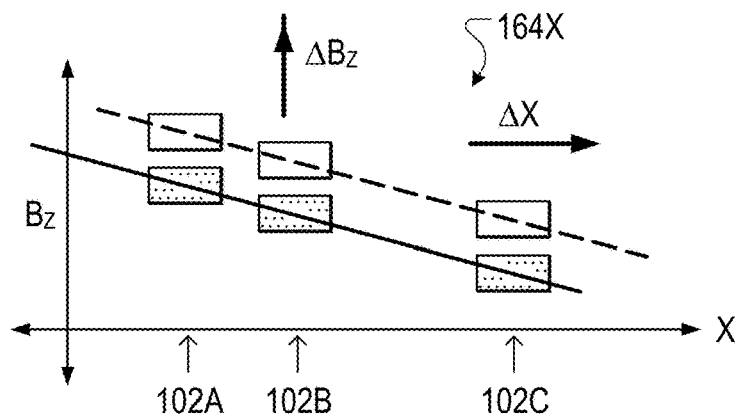

Referring now to a system of linear equations similar to the one in EQ. 7, if both the first condition given by EQ. 8 is satisfied and the mass 154 moves only along the x-axis (i.e., a displacement ΔX≠0 and a displacement ΔZ→0), then the displacement ΔX of the mass causes a uniform change along the x-axis of the component $B_Z$ of the magnetic field. As such, graph 164X shown in FIG. 4B illustrates that $\Delta B_Z(102A) = \Delta B_Z(102B) = \Delta B_Z(102C)$, although $B_Z(102A) > B_Z(102B) > B_Z(102C)$. In other words, for changes $\Delta B_Z$ of a component $B_Z$ of the magnetic field that are caused by the same displacement ΔX of the mass 154 but are measured at different locations, a change $\Delta B_Z$ at a location where the component $B_Z$ has a small magnitude is equal to another change $\Delta B_Z$ at another location where the component $B_Z$ has a large magnitude.

Figure 4C:
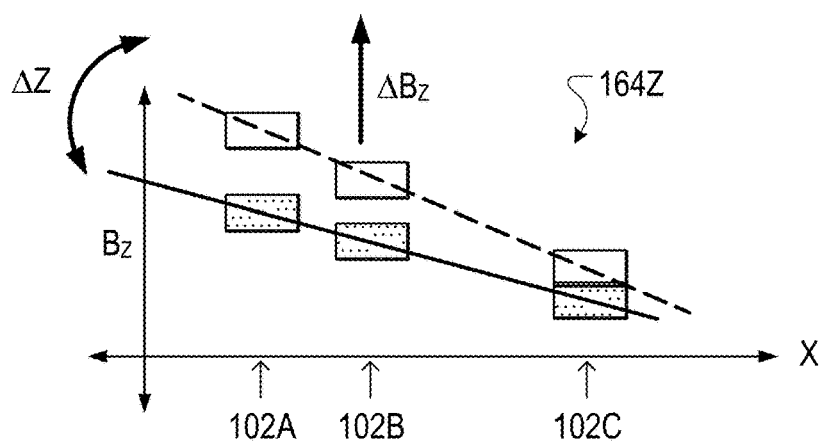

However, if both the first condition given by EQ. 8 is satisfied and the mass 154 moves only along the z-axis (i.e., a displacement ΔZ≠0 and a displacement ΔX→0), then the displacement ΔZ of the mass causes a scaled change along the x-axis of the component $B_Z$ of the magnetic field. As such, graph 164Z shown in FIG. 4C illustrates that $\Delta B_Z(102A) > \Delta B_Z(102B) > \Delta B_Z(102C)$ because $\Delta B_Z(102A) = (1+\alpha\Delta Z)B_Z(102A)$ and $\Delta B_Z(102B) = (1+\alpha\Delta Z)B_Z(102B)$ and $\Delta B_Z(102C) = (1+\alpha\Delta Z)B_Z(102C)$, where $B_Z(102A) > B_Z(102B) > B_Z(102C)$. In other words, for changes $\Delta B_Z$ of a component $B_Z$ of the magnetic field that are caused by the same displacement ΔZ of the mass 154 but are measured at different locations, a change $\Delta B_Z$ at a location where the component $B_Z$ has a small magnitude is smaller than another change $\Delta B_Z$ at another location where the component $B_Z$ has a large magnitude.

As illustrated in FIGS. 4B-4C, if a separation $d_n$ between locations of magnetic field sensing elements is small (e.g., like the separation $d_1$ between the second magnetic field sensing element 110ZB and the first magnetic field sensing element 110ZA), then it cannot be distinguished whether the measured changes $\Delta B_Z(102n)$ and $\Delta B_Z(102(n+1))$ were caused by a displacement ΔZ along the z-axis or a displacement ΔX along the x-axis, because it is likely that the magnitudes of $B_Z(102n)$ and $B_Z(102(n+1))$ are about the same at nearby locations. As such, magnetic field sensing elements that are separated by a large separation $d_n$ (e.g., like separation $d_2$ between the second magnetic field sensing element 110ZB and the third magnetic field sensing element 110ZC or like separation $d_1 + d_2$ between the first magnetic field sensing element 110ZA and the third magnetic field sensing element 110ZC) will be used to determine a displacement ΔZ of the mass 154. In such cases, given a large $d_n$ and a known gradient $\delta B_Z/\delta X$ (or a pre-calibrated magnitude of $B_Z$ at the locations separated by $d_n$), a displacement ΔZ of the mass 154 can be estimated with fine resolution using EQ. 10. Further, as a small magnitude $B_Z$ changes by the same $\Delta B_Z$ as a large magnitude $B_Z$ when caused by a displacement ΔX along the x-axis, magnetic field sensing elements that are separated by a small separation do (e.g., like separation $d_1$ between the adjacent first and second magnetic field sensing elements 110ZA, 110ZB) will be used to determine a displacement ΔX of the mass 154.

The DSP 122 can perform determinations of a displacement ΔY of the mass 154 along the y-axis by generalizing EQ. 6-10. Referring again to FIG. 3A, the nonlinearity of a cross-section along the segment CD parallel to the y-axis of the representation of the spatial distribution 160Z of the axial component $B_Z(X,Y)$ suggests that (i) determination of a displacement ΔY along the y-axis is sensitive to the curvature of the cross-section along the segment CD between end point C and point $P_3$, and (ii) determination of ΔY is sensitive to the slope of the cross-section along the segment CD between point $P_3$ and end point D. Moreover, as a large $\delta B_Z/\delta Y$ is needed to obtain an accurate ΔY displacement measurement (using an equation similar to EQ. 8), a magnetic field sensing element to be used for determining the ΔY displacement will be disposed between the center and the edge of the die 101, where a value of $\delta B_Z/\delta Y$ is expected to be largest. This is shown in FIG. 1A, where the magnetic field sensing elements 110ZA, 110ZB, 110ZC are off-centered along the width of the die 101.

Referring again to EQ. 8, note that values of the gradient $\delta B_Z/\delta X$ at various locations of the die 101 where the magnetic field sensing elements of the array 110 are disposed are measured as part of a calibration procedure described below. A procedure to equalize sensitivity of the magnetic field sensing elements of the array 110 is described first.

Figure 5A:
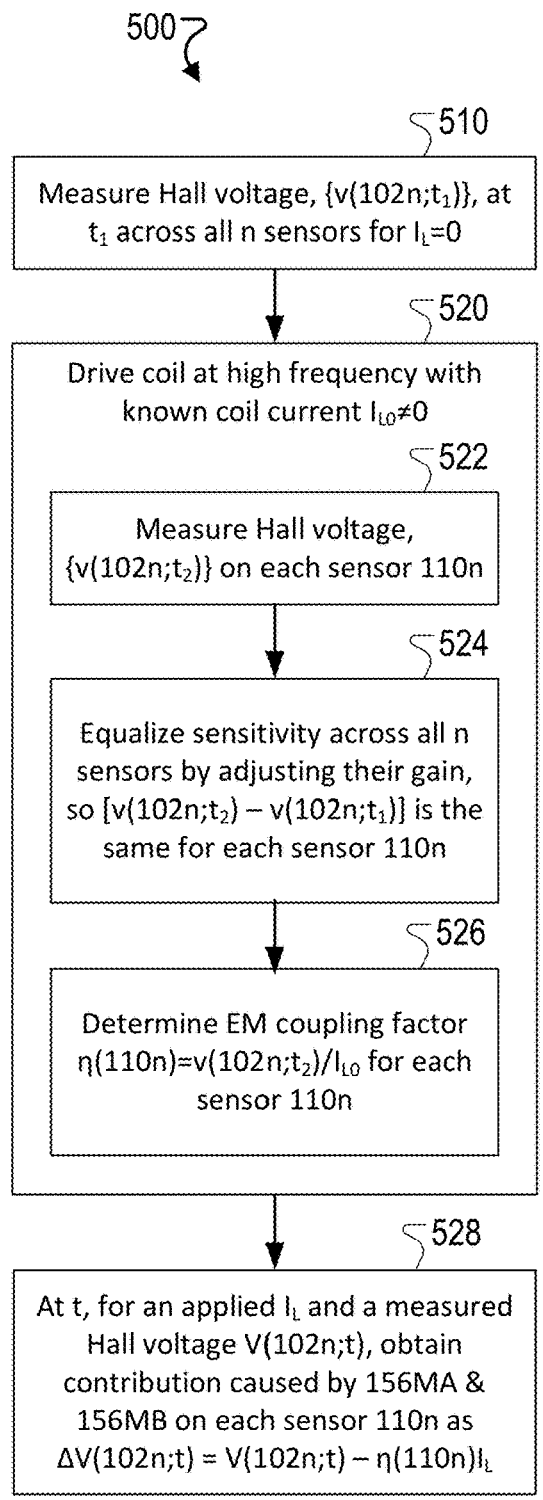
FIG. 5A shows an example of a process for equalizing sensitivity of magnetic field sensing elements.

FIG. 5A is a flow chart of an example of a process 500 used to equalize sensitivity across the magnetic field sensing elements of the array 110 of the IC chip 100 when the latter is part of the haptic engine 150. In this example, each magnetic field sensing element 110Zn, where n is {A, B, C, . . . }, is a Hall-effect sensing element that transduces a magnitude and direction of a component $B_Z(102n)$ of the magnetic field along the z-axis, at the Hall-effect sensing element's location 102n, to a Hall voltage V(102n). The process 500 is performed by at least one of the circuits of the mix-signal circuitry 120, and by controller circuitry of the haptic engine 150.

At 510, while the mass 154 is at rest and no current is provided to the fixed portions 156FA, 156FB of the magnetic field source (e.g., the coils A and B), i.e., for $I_L=0$, Hall voltages {v(102n;$t_1$)} at respective locations {102n} are measured, at time $t_1$, across all n Hall-effect sensing elements of the array 110.

At 520, the fixed portions 156FA, 156FB of the magnetic field source (e.g., the coils A and B) of the haptic engine 150 are driven at high frequency with known coil current $I_{L0}\neq 0$, to avoid moving the mobile portions 156MA, 156MB of the magnetic field source (e.g., the permanent magnets A and B).

While performing 520, the following operations are being performed. At 522, a respective Hall voltage v(102n;$t_2$) at a corresponding location 102n is measured, at time $t_2$, on each of the n Hall-effect sensing elements of the array 110. At 524, sensitivity across all n Hall-effect sensing elements of the array 110 is equalized, by adjusting their gain, so v(102*n*;t$_2$)−v(102*n*;t$_1$) is the same for all n Hall-effect sensing elements. This ensures that each Hall-effect sensing element 110Zn will output the same value of the Hall voltage V(102*n*) when the Hall-effect sensing element senses the same field. At 526, a relationship between the Hall voltages v(102*n*;t$_2$) and the known coil current I$_{L0}$ is determined. For instance, a linear approximation can be used for this purpose, v(102*n*;t$_2$)=η(110Zn)I$_{L0}$, where η(110Zn) is referred to as the electromagnetic (EM) coupling factor for the Hall-effect sensing element 110Zn.

At 528, and at subsequent operations performed by any of the circuits of the mix-signal circuitry 120, and by the controller circuitry of the haptic engine 150, if at time t a Hall-effect sensing element 110Zn measures a voltage V(102*n*;t) while the fixed portions 156FA, 156FB of the magnetic source are driven with a coil current I$_L$, then the contribution ΔV(102*n*;t) to the measured voltage caused by the mobile portions 156MA, 156MB of the magnetic source is determined as ΔV(102*n*;t)=V(102*n*;t)−η(110Zn)I$_L$. In other words, a contribution of the coil current-induced Hall voltage η(110Zn)I$_L$ is subtracted from the sensed Hall voltage V(102*n*;t), and only an effective Hall voltage ΔV(102*n*;t) caused by the moving permanent magnets is used for all subsequent calculations.

Figure 5B:
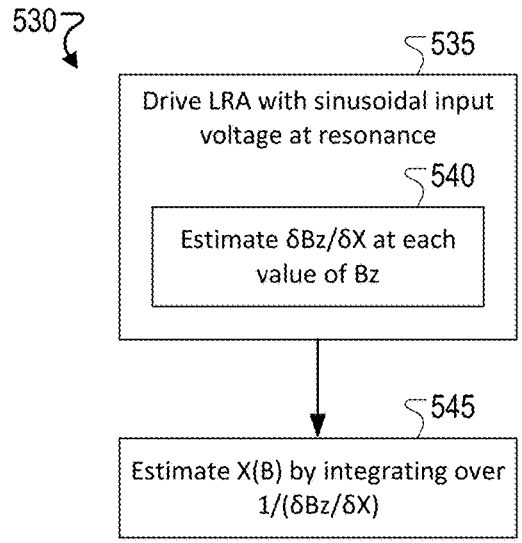
FIGS. 5B-5D show aspects of a calibration process applied to an array of asymmetrically distributed magnetic field sensing elements.

FIG. 5B is a flow chart of a calibration process 530 used for determining a gradient δB$_Z$/δX at the sensing plane 105 of the haptic engine 150. In some implementations, each magnetic field sensing element 110Zn, where n is {A, B, C, . . . }, is a Hall-effect sensing element that measures a magnitude and direction of a component B$_Z$(102*n*) of the magnetic field along the z-axis at the Hall-effect sensing element's location 102*n*. The process 500 is performed by at least one of the circuits of the mix-signal circuitry 120, and by controller circuitry of the haptic engine 150.

At 535, the haptic engine 150, which is a linear resonant actuator (LRA), is driven with sinusoidal input voltage at resonance. While 535 is in progress, the following operations are performed.

Figure 5C:
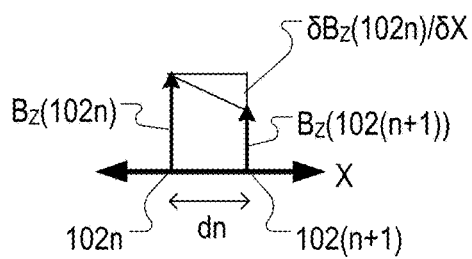

At 540, the gradient δB$_Z$/δX at the sensing plane 105 of the haptic engine 150 is estimated for a set of values of B$_Z$, in the range from 0 to B: B$_Z$={0, B$_{Z1}$, B$_{Z2}$, . . . , B} Here, the gradient δBZ/δX at a location 102(*n*+0.5) between locations 102*n* and 102(*n*+1) that are separated by a separation d$_n$ is estimated geometrically, in accordance with FIG. 5C, in the following manner:

$$\frac{\delta B_Z(102(n+0.5))}{\delta X} \cong \frac{B_Z(102(n+1)) - B_Z(102n)}{d_n}. \quad (11)$$

The value of δB$_Z$/δX at the exact locations 102*n* and 102(*n*+1) is later obtained by interpolation between a large set of δB$_Z$(102(*n*+0.5))/δX values measured at different values of B$_Z$(102*n*). Note that while the foregoing set of large values is obtained by sweeping over X, in order to change the value of B$_Z$(102*n*), the actual value of x at location 102(*n*+0.5) is not needed.

At 545, a value of B$_Z$ as a function, X(B), over the position along the x-axis in a range from B$_1$ to B$_2$ is estimated by integrating over the inverse of the determined gradient 1/(δB$_Z$/δX) in the following manner:

$$X(B) = \int_{B1}^{B2} \frac{1}{\left(\frac{\delta B_Z}{\delta X}\right)} dB_Z. \quad (12)$$

Figure 5D:
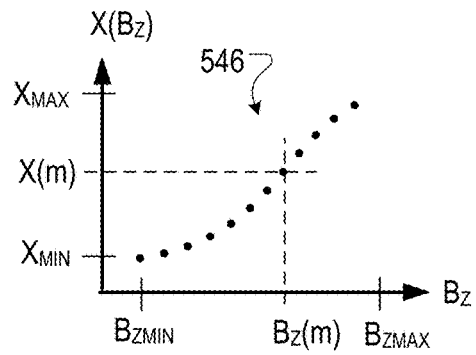

Based on the assumption that X(B) is a single-valued function of B$_Z$, the determined function X(B) can be used to map every measured value of B$_Z$(for instance B$_Z$(102*n*) at location 102*n*) to a unique value of X. FIG. 5D shows a look up table (LUT) 546, shown here as a graph of X vs. B$_Z$, that stores an example of a set of pairs of estimated positions X(B$_Z$) of the moving mass 154, between X$_{MIN}$ and X$_{MAX}$, and corresponding measured values of the magnetic field component B$_Z$, between B$_{Z\,MIN}$ and B$_{Z\,MAX}$, obtained based on EQ. 12. Thus, by simply measuring B$_Z$(m), at a sensor 110Zn, the position of the moving mass 154 can be estimated by simply reading from LUT 546 a value X(m) corresponding to the measured value B$_Z$(m).

In this manner, a displacement of the mass 154 is referenced by a combination of geometries of the IC chip 100 and of the haptic engine 150 (e.g., separations d$_1$, d$_2$, etc. between magnetic field sensing element 110ZA, 110ZB, etc. of the array 110) rather than geometry of an external tester. Further note that the positions of the mass 154 estimated from LUT 546 based on measurements of the magnetic field component B$_Z$ corresponds to a "macroscopic motion" of the mass, e.g., over 10s or 100s of microns.

Moreover, the DSP 122 can determine displacements ΔZ and ΔX of the moving mass 154 that correspond to its "microscopic motion", e.g., at a sub-micron or micron scale, by using the gradient δBZ/δX that has been determined in accordance with the process 530, as described below.

Figure 5E:
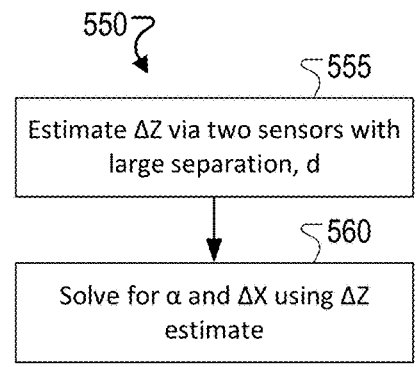
FIG. 5E shows an example of a process for determining a displacement of a mass using an array of asymmetrically distributed magnetic field sensing elements.

FIG. 5E is a flow chart of a process 550 used during run-time of the IC chip 100 to determine displacements ΔZ and ΔX of a mass 154, where the mass and the IC chip are part of the haptic engine 150, and the IC chip is disposed at a sensing plane 105 of the haptic engine. Here, the displacements ΔZ and ΔX correspond to microscopic motion riding on macroscopic motion, the latter causing the mass 154 to sweep through locations X(B), in accordance with EQ. 12 and LUT 546. In some implementations, each magnetic field sensing element 110Zn, where n is {A, B, C, . . . }, is a Hall-effect sensing element that measures a magnitude and direction of a component B$_Z$(102*n*) of the magnetic field along the z-axis at the Hall-effect sensing element's location 102*n*. The process 550 is performed by the DSP 122 of the mix-signal circuitry 120. The process 550 uses sensors at more than 2 locations 102*n* with different separations, d$_n$ (and hence different sensitivities of the measurements of displacement ΔZ and displacement ΔX, respectively, according to EQs. 7-10), to simultaneously solve for the displacements ΔZ and ΔX.

At 555, a displacement ΔZ(α) along the z-axis is estimated using two magnetic field sensing elements of the array 120 disposed at locations spaced apart by a large separation, in accordance with EQ. 10, and using the gradient δBZ/δX determined based on the process 530. For example, changes ΔB$_Z$ measured by the second magnetic field sensing element 110ZB and the third magnetic field sensing element 110ZC at the respective second location 102B and third location 102C that are separated by a separation d$_2$ can be used for the estimation performed at 555. As another example, changes ΔB$_Z$ measured by the first magnetic field sensing element 110ZA and the third magnetic field sensing element 110ZC at the respective first location 102A and third location 102C that are separated by a separation $d_1+d_2$ can be used for the estimation performed at 555.

At 560, parameter a and a displacement $\Delta X$ along the x-axis of the mass 154 are determined using two magnetic field sensing elements of the array 110 disposed at locations spaced apart by a small separation and the gradient $\delta BZ/\delta X$ determined based on the process 530. For example, changes $\Delta B_Z$ measured by the first magnetic field sensing element 110ZA and the second magnetic field sensing element 110ZB at the respective first location 102A and second location 102B that are separated by a separation $d_1$ can be used for the determination performed at 560. This determination is performed by inverting EQ. 7 in the following manner:

$$\begin{bmatrix} \alpha \\ \Delta X \end{bmatrix} = \begin{bmatrix} \alpha Z B_Z(102A) & \frac{\delta B_Z(102A)}{\delta X} \\ \alpha Z\left(B_Z(102A) + d_1 \frac{\delta B_z(102A)}{\delta X}\right) & \frac{\delta B_Z(102B)}{\delta X} \end{bmatrix}^{-1} \begin{bmatrix} \Delta B_Z(102A) \\ \Delta B_Z(102B) \end{bmatrix}. \quad (13)$$

Note that EQs. 10 and 13 constitute a system of three linear equations with three unknowns $\alpha$, $\Delta Z$, $\Delta X$. Such system of linear equations can have a unique solution.

Note that when the magnetic field sensing elements of the array 110 are tri-axial Hall-effect sensing elements 110A, 110B, 110C, etc., the motion of the mass 154 of the haptic engine 150 can be sensed based on the angle ang(B) formed by the magnetic field with the z axis, instead of based on the component $B_Z$ along the z-axis of the magnetic field. The angle ang(B) is determined by the DSP 122, based on the spatial distribution 160Z of the axial component $B_Z(X,Y)$ shown in FIG. 3A and the spatial distribution 160XY of the transverse component $B_{XY}(X,Y)$ shown in FIG. 3B, as $$ang(B)(X, Y) = \tan^{-1}\left(\frac{B_Z(X, Y)}{B_{XY}(X, Y)}\right). \quad (14)$$

In EQ. 14, the transverse component $B_{XY}(X,Y)$ is obtained by the DSP 122 using EQ. 6. In the example shown in FIG. 2A, orientation of ang(B) at the sensing plane 105 corresponds to orientation of the magnetic field lines thereat.

Note that the displacements $\Delta X$ and $\Delta Z$ of the mass 154, in terms of changes $\Delta[ang(B)]$ of the magnetic field angle ang(B), can be determined by solving EQs. 7-13, where $\Delta[ang(B)]$ is substituted for $\Delta B_Z$. In this manner, the displacements $\Delta X$ and $\Delta Z$ of the mass 154 can now be encoded in angular domain, so they can be determined based on a ratio-metric measurement of the magnetic field angle ang (B), in accordance with EQ. 14. As determinations of the displacements $\Delta X$ and $\Delta Z$ of the mass 154 are based on a ratio-metric measurement, results of these determinations are insensitive to temperature change. Further, this approach also enables the DSP 122 to differentiate rotational motion from translational motion. Furthermore, processes 530 and 550 can be used, in a manner similar to the one described above in connection with FIGS. 5B-5E, to determine the displacements $\Delta X$ and $\Delta Z$ of the mass 154 based on the changes $\Delta[ang(B)]$ measured by the tri-axial Hall-effect sensing elements 110A, 110B, 110C. For instance, the DSP 122 uses first the process 530 to determine the gradient $\delta[ang(B)]/\delta X$, and then the process 550 to determine the displacements $\Delta X$ and $\Delta Z$ of the mass 154 based on the determined gradient $\delta[ang(B)]/\delta X$.

Note that technologies described above in connection with FIGS. 5A-5E use deterministic EQs. 10-12 to transform an input set of values of measured magnetic field $B_Z$ or measured change $\Delta B_Z$ of the magnetic field into an output set of values of a position X of a moving mass 154, or variations (also referred to as displacements) $\Delta X$ and $\Delta Z$ around its position X. In this manner, each instance of an input set of values of measured magnetic field $B_Z$ or measured change $\Delta B_Z$ of the magnetic field results in an output set of values of the position X and displacements $\Delta X$ and $\Delta Z$ that is independent of other output sets of values of the position X and displacements $\Delta X$ and $\Delta Z$ that have been previously obtained from respective sets of previously measured magnetic field $B_Z$ or measured change $\Delta B_Z$ of the magnetic field.

Figure 5F:
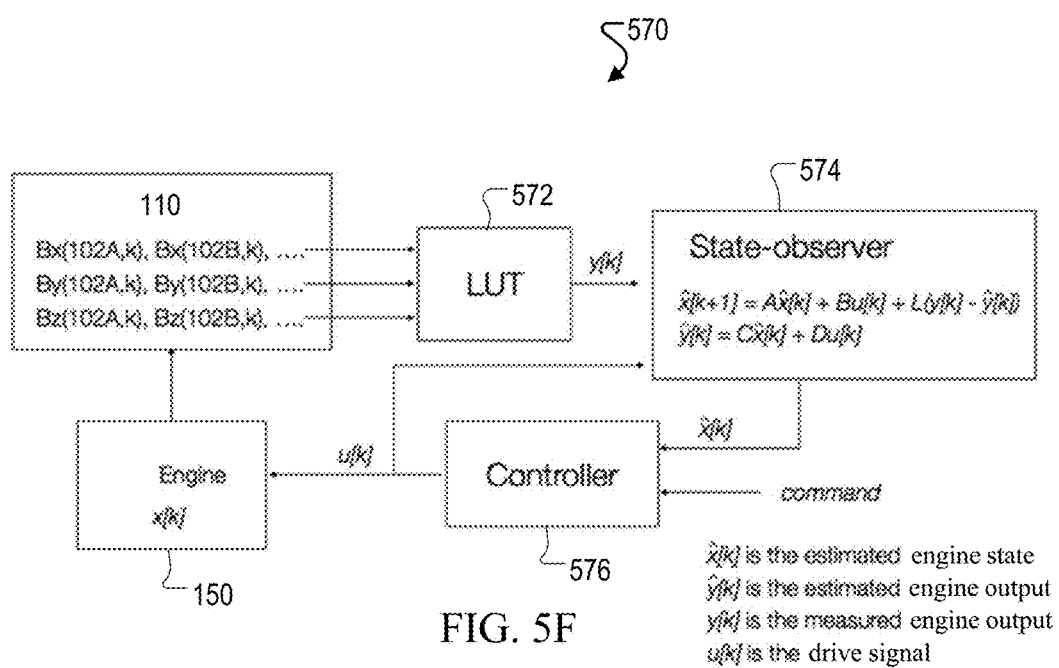
FIG. 5F shows an example of a system for determining a displacement of a mass using an array of asymmetrically distributed magnetic field sensing elements.

In an embodiment alternative to the one shown in FIGS. 5A-5E, the disclosed technologies can be used in conjunction with a state-observe feedback control system in which it is not necessary to perform a self-calibration. FIG. 5F shows a state-observer feedback control system 570 that includes uses the array 110 of magnetic field sensing elements, e.g., described above in connection with FIG. 1A, look-up-table (LUT) 572, a state-observer 574, a controller 576 and the haptic engine 150 (that includes the mass 154, the magnetic field source 156, etc.)

The state-observer feedback control system 570 uses the array 110 of magnetic field sensing elements to measure various magnetic field components $B_X(k)$, $B_Y(k)$, $B_Z(k)$ at a respective position 102A, 102B, etc. of each sensor 110A, 110B, etc. These measured values are used to interpolate LUT 572 to generate a measured plant output y[k]. Note that, in this example, the plant is the haptic engine 150, and x[k] is a state of the haptic engine. Here, the state x[k] of the haptic engine includes a current X position of the mass 154. As such, in this example, the plant output y[k] represents a measured X position of the mass 154 given its current position x[k] and a driving signal u[k] acting on the mass. For instance, the driving signal u[k] can be a coil current $I_L$.

The LUT 572 can be calibrated using a reference sensor. For example, a laser profiler can be used to measure the X position (y[k] state is the X position, in this case) of the engine 150's moving mass 154 while the engine is actuated. A set of B field measurements is collected by the sensor array 110 over this set of known y[k] states and the LUT 572 is generated to lookup y[k] for a given set of B field measurements.

The state observer 574 receives the measured engine output y[k] (e.g., the measured X position) from LUT 572 and uses it as a first input. Moreover, the state observer 574 estimates the engine state $\hat{x}[k]$ and an estimated engine output $\hat{y}[k]$, using the following equations:

$$\hat{x}[k+1] = A\hat{x}[k] + Bu[k] + L(y[k] - \hat{y}[k]) \quad (15),$$

$$\hat{y}[k] = C\hat{x}[k] + Du[k] \quad (16).$$

Note that by using a parametrized model of the engine 150 in accordance with EQs. 15-16, the state observer 574 obtains an estimate of the next engine state $\hat{x}[k+1]$ based on a current estimate of the same, a current estimate of the engine output $\hat{y}[k]$, and a discrepancy between the output measurements y[k] and the output estimate $\hat{y}[k]$.

The estimated engine state $\hat{x}[k]$ along with an input command are used by the controller 576 to provide a drive signal u[k]. The drive signal u[k] is returned to the state observer 574 through a feedback loop, where it is used by the state observer 574 as a second input along with the first input noted above. Additionally, the drive signal u[k] is provided to the engine 150 having an engine state x[k].

Moreover, the IC chip 100 can be modified in various ways and then used in the haptic engine 150 to determine a displacement ΔY along the y-axis of the mass 154 concurrently with determining the displacements ΔX and ΔZ thereof.

Figure 6:
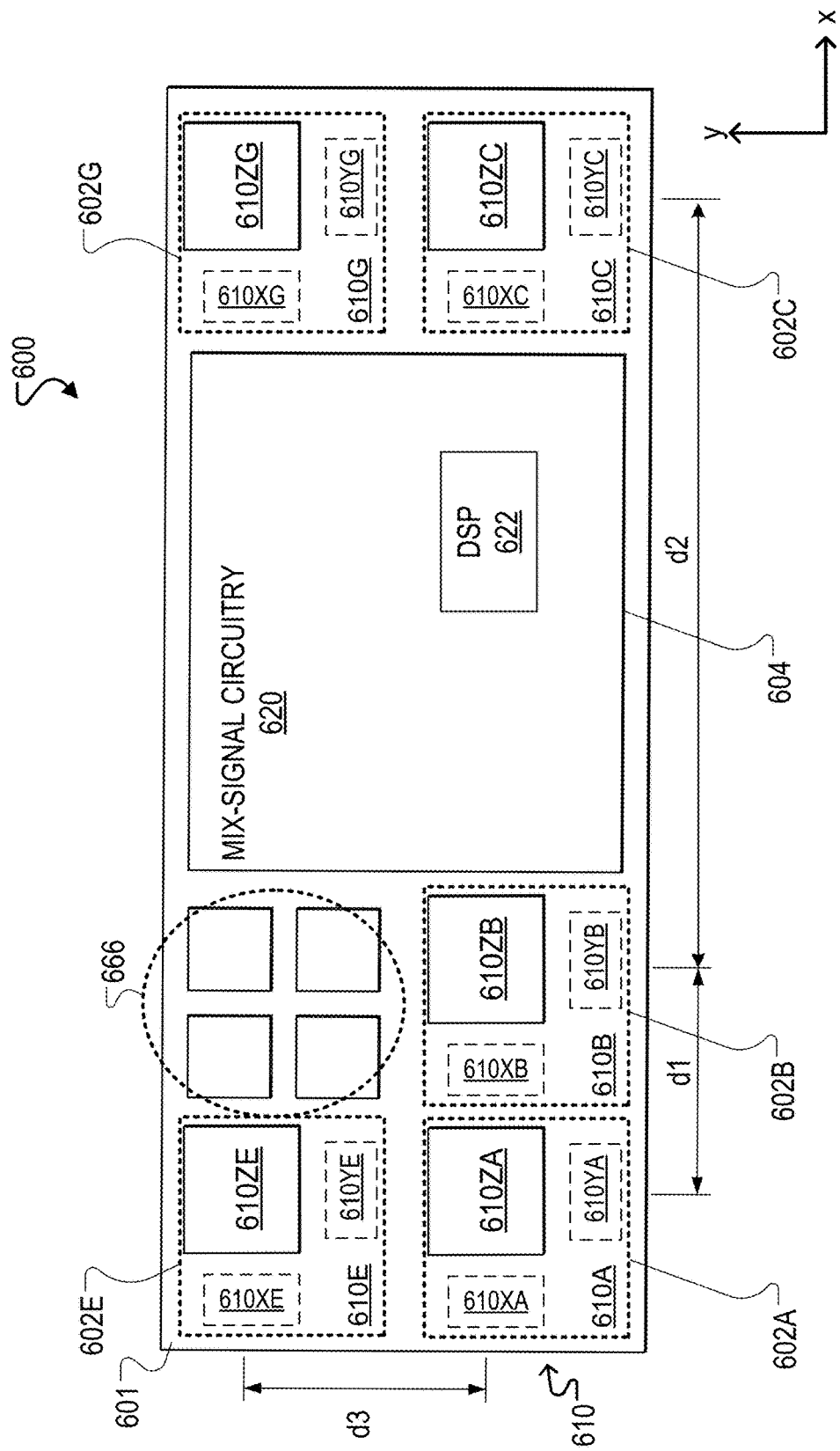
FIG. 6 shows an example of another IC chip including an array of asymmetrically distributed magnetic field sensing elements.

FIG. 6 is a plan view, e.g., in the (x,y) plane, of an example of a modified IC chip 600 that includes an array 610 of magnetic field sensing elements, an array of contact pads 666, and mix-signal circuitry 620 formed on a die 601. The magnetic field sensing elements of the array 610 are distributed on the die 601 along two rows extending along a first direction. e.g., along the x-axis. Here, some of the magnetic field sensing elements of the array 610 are disposed at locations 602A, 602B, 602C along the first row, and at locations 602E, 602G along the second row, for instance. The second location 602B is between the first location 602A and the third location 602C, and the second location is separated from the first location by a first distance $d_1$ and from the third location by a second distance $d_2$ different from the first distance. Moreover, the first and second rows are separated from each other by a third distance $d_3$. In this example, the mix-signal circuitry 620 is disposed in a central area 604 of the die 601 that separates, along the x-axis, the second location 602B and the third location 602C on the first row, as well as the fourth location 602E and the fifth location 602G on the second row. As such, the second distance $d_2$ is larger than the first distance $d_1$, and the magnetic field sensing elements of the array 610 are said to be asymmetrically distributed along the x-axis.

In some implementations, each magnetic field sensing element 610ZA, 610ZB, 610ZC, 610ZE, 610ZG is a single-axial magnetic field sensing element configured to measure, when the IC chip 600 is disposed in the sensing plane 105 of the haptic engine 150, at its respective location 602A, 602B, 602C, 602E, 602G, the $B_Z$ component of the magnetic field B. In other implementations, each magnetic field sensing element 610A, 610B, 610C, 610E, 610G is a tri-axial magnetic field sensing element configured to measure, when the IC chip 600 is disposed in the sensing plane 105 of the haptic engine 150, at its respective location 602A, 602B, 602C, 602E, 602G, all three components $B_Z$, $B_X$ and $B_Y$ of a magnetic field B. In this case, for example, the tri-axial magnetic field sensing element 610A includes a combination of (i) a single-axial magnetic field sensing element 610ZA configured to measure, at its location 602A, a component $B_Z$ along the z-axis, (ii) a single-axial magnetic field sensing element 610XA configured to measure, at its location 602A, a component $B_X$ along the x-axis, and (iii) a single-axial magnetic field sensing element 610YA configured to measure component $B_Y$ along the y-axis.

The array 610 of magnetic field sensing elements of the IC chip 600 is used to measure changes in the magnetic field, e.g., $\Delta B_Z$ or $\Delta[\text{ang}(B)]$, at respective locations of the magnetic field sensing elements, such that determinations of both displacement ΔX along the x-axis and displacement ΔY along the y-axis can be performed concurrently with determinations of displacement ΔZ along the z-axis of the mass 154. Here, magnetic field sensing elements, at the locations 102A, 102C separated by $d_1+d_2$ on the first row, are used by the DSP 622 of the mix-signal circuitry 620 to determine displacement ΔZ of the mass 154 using EQ. 8; magnetic field sensing elements, at the locations 102A, 102B separated by $d_1$ on the first row, are used by the DSP 622 to determine displacement ΔX of the mass 154 using EQs. 8 and 11; and magnetic field sensing elements, at the locations 102A, 102E separated by $d_3$ between the first and second rows, are used by the DSP 622 to determine displacement ΔY of the mass 154 using equations similar to EQs. 8 and 11.

Figure 7:
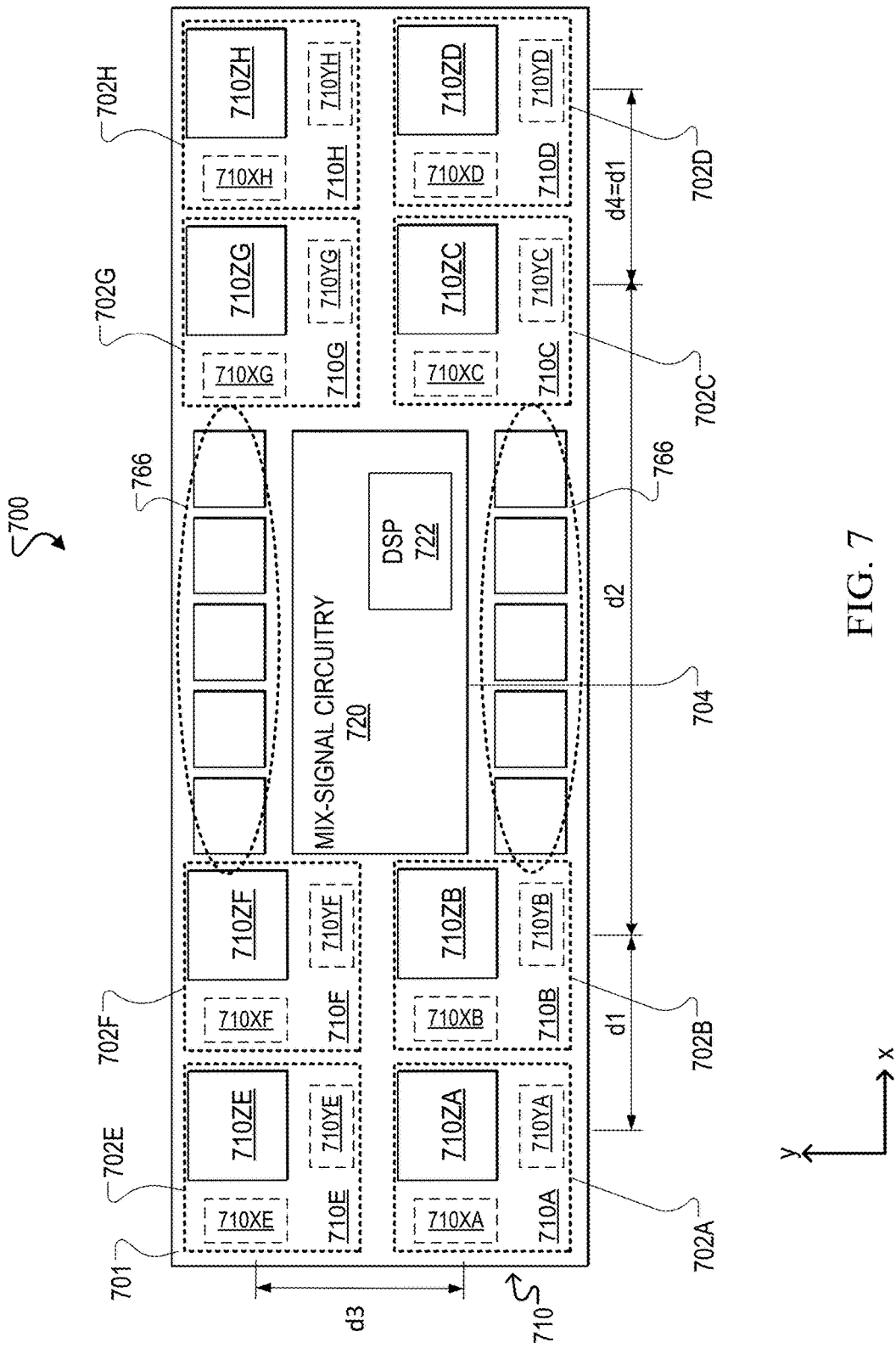
FIG. 7 shows an example of an IC chip including an array of symmetrically distributed magnetic field sensing elements.

FIG. 7 is a plan view, e.g., in the (x,y) plane, of another example of a modified IC chip 700 that includes an array 710 of magnetic field sensing elements, an array of contact pads 766, and mix-signal circuitry 720 formed on a die 701. The magnetic field sensing elements of the array 710 are distributed on the die 701 along two rows extending along a first direction. e.g., along the x-axis. Here, some of the magnetic field sensing elements of the array 710 are disposed at locations 702A, 702B, 702C, 702D along the first row, and at locations 702E, 702F, 702G, 702H along the second row, for instance. The second location 702B (the sixth location 702F) is between the first location 702A (the fifth location 702E) and the third location 702C (the seventh location 702G), and the second location (the sixth location) is separated from the first location (the fifth location) by a first distance $d_1$ and from the third location (the seventh location) by a second distance $d_2$ different from the first distance. Also, the third location (the seventh location) is separated from the fourth location (the eighth location) by the same first distance $d_1$. Moreover, the first and second rows are separated from each other by a third distance $d_3$. In this example, the mix-signal circuitry 720 is disposed in a central area 704 of the die 701 that separates, along the x-axis, the second location 702B and the third location 702C on the first row, as well as the sixth location 702F and the seventh location 702G on the second row. As such, the magnetic field sensing elements of the array 710 are said to be symmetrically distributed along the x-axis.

In some implementations, each magnetic field sensing element 710ZA, 710ZB, 710ZC, 710ZD, 710ZE, 710ZF, 710ZG, 710ZH is a single-axial magnetic field sensing element configured to measure, when the IC chip 700 is disposed in the sensing plane 105 of the haptic engine 150, at its respective location 702A, 702B, 702C, 702D, 702E, 702F, 702G, 702H the $B_Z$ component of the magnetic field B. In other implementations, each magnetic field sensing element 710A, 710B, 710C, 710D, 710E, 710F, 710G, 710H is a tri-axial magnetic field sensing element configured to measure, when the IC chip 700 is disposed in the sensing plane 105 of the haptic engine 150, at its respective location 702A, 702B, 702C, 702D, 702E, 702F, 702G, 702H, all three components $B_Z$, $B_X$ and $B_Y$ of a magnetic field B. In this case, for example, the tri-axial magnetic field sensing element 710A includes a combination of (i) a single-axial magnetic field sensing element 710ZA configured to measure, at its location 702A, a component $B_Z$ along the z-axis, (ii) a single-axial magnetic field sensing element 710XA configured to measure, at its location 702A, a component $B_X$ along the x-axis, and (iii) a single-axial magnetic field sensing element 710YA configured to measure component $B_Y$ along the y-axis.

The array 710 of magnetic field sensing elements of the IC chip 700 is used to measure, at respective locations of the magnetic field sensing elements, changes $\Delta B_Z$ (or $\Delta[\text{ang}(B)]$) in the magnetic field. As such, the DSP 722 can determine curvature of the spatial distribution 160XY of the transverse component $B_{XY}(X,Y)$ of the magnetic field, e.g., in terms of $\delta^2 B_Z/\delta X^2$. For instance, changes $\Delta B_Z$ measured by magnetic field sensing elements disposed on the first row, at locations 702A, 702B separated by $d_1$, on one side of the central area 704, are used by the DSP 722 to determine a first instance of $\delta B_Z/\delta X$; and changes $\Delta B_Z$ measured by magnetic field sensing elements disposed on the first row, at locations

702C, 702D also separated by $d_1$, on the opposing side of the central area 704, are used by the DSP 722 to determine a second instance of $\delta B_Z/\delta X$. However, a difference of the first and second instances of $\delta B_Z/\delta X$—over the separation (d1+ d2) between the magnetic field sensing elements disposed on the first row, at locations 702A, 702C—is $\delta^2 B_Z/\delta X^2$.

Note that the foregoing capability of the IC chip 700 can be used when a displacement $\Delta X$ extends outside of the linear region II into region I or region III, or both, as shown in FIG. 3C. In such cases EQ. 2 can be modified to include quadratic changes in the magnetic field, e.g., $\delta^2 B_Z/\delta X^2$, which are measured by the IC chip 700 as explained above. Then, the DSP 722 can determine displacement $\Delta Z$ along the z-axis and displacement $\Delta X$ along the x-axis from EQs. 2 and 6-11 appropriately modified to include quadratic terms $\delta^2 B_Z/\delta X^2$.

Note that, for either of the implementations of the IC chip 100, 600 and 700, by placing the magnetic field sensing elements of their respective arrays 110, 610, 710 on both sides of respective mixed-signal circuitry 120, 620, 720 makes efficient use of the silicon real-estate while producing a large value of the separation $d_n$ between at least some of the magnetic field sensing elements. In addition, the magnetic field sensing elements that are asymmetrically disposed in the X or Y directions are beneficially used for measuring changes in the magnetic field, e.g., $\Delta B_Z$ or $\Delta[\text{ang}(B)]$, so the measured changes in the magnetic field can then be used for accurately determining the displacement $\Delta Z$.

Figure 8:
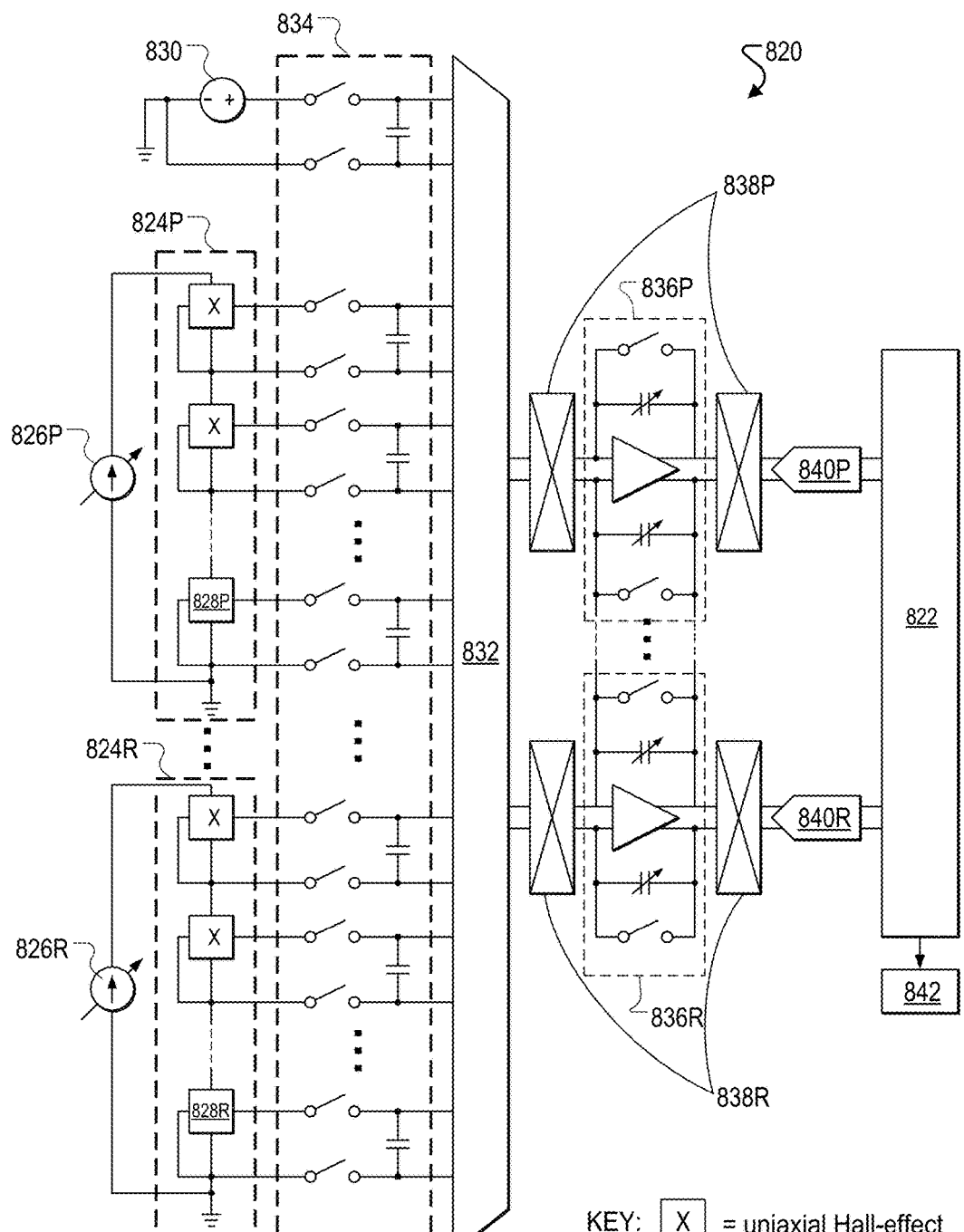
FIG. 8 is circuit diagram of an ASIC including an array of magnetic field sensing elements.

FIG. 8 is a circuit diagram of an example of mix-signal circuitry 820 integrated together with multiple magnetic field sensing elements on an IC chip that is implemented as an ASIC. In this example, each of the magnetic field sensing elements is implemented as a uniaxial Hall-effect sensing element. Any one of the IC chips 100, 600, 700 described above in connection with FIGS. 1A, 6, 7, respectively, can be implemented as the ASIC shown in FIG. 8. The ASIC shown in FIG. 8 can be placed in the sensing plane 105 of the haptic engine 150 that includes mass 154.

In the example shown in FIG. 8, the ASIC chip includes one or more driving circuits 826P, 826R, etc. Each driving circuit 826P (or 826R, etc.) includes a programmable current source 826P (or 826R, etc.), two or more Hall-effect sensing elements, and a dummy load 828P (or 828R, etc.) connected to each other in series. For example, the programmable current source 826P (or 826R, etc.) can be implemented as a single current steered DAC. Using chip 100 as an example, a single current source 826P (or 826R, etc.) can be shared between 2 or more sensors. One example would be one current source for sensors 110XA and 110XB, another current source for sensors 110YA and 110YB, another current source for sensors 110ZA and 110ZB, another current source for sensors 110XC and 110YC, and another current source for 110ZC. In yet another example, a single current source can be shared by 110XA, 110YA, and 110ZA. Other combinations are also possible. This grouping in series of the driving circuit 826P (or 826R, etc.) can cause power savings, as Hall-effect sensing elements are conventionally connected in parallel, each with its own current source, which consumes a lot of power. The dummy load 828P (or 828R, etc.) is a reference resistor with known resistance for calibrating a respective current source 826P (or 826R, etc.) For example, such a dummy load resistor can be fabricated in modern complementary-metal-oxide-semiconductor (CMOS) technologies using gate-poly-silicon, doped silicon, biased transistor (in linear region), etc.

In the example shown in FIG. 8, the mix-signal circuitry 820 further includes a band-gap reference circuit 830. A temperature insensitive background calibration can be performed by comparing the voltage across the dummy loads 828P, 828R, etc., against the single band-gap reference circuit 830.

In the example shown in FIG. 8, the mix-signal circuitry 820 further includes sample-and-hold (S/H) circuits 834, each of the S/H circuit including a capacitor. The S/H circuitry 834 allows global shutter capture which reduces motion blur.

In the example shown in FIG. 8, the mix-signal circuitry 820 further includes, for each of the driving circuits, an analog multiplexer circuit 832P (or 832R, etc.), a programmable gain amplifier (PGA) circuit 836P (or 836R, etc.), and an analog to digital converter (ADC) circuit 840P (or 840R, etc.) The analog multiplexer circuit 832 includes input ports and an output port, wherein an output of each of the corresponding magnetic field sensing elements, the respective dummy 828P (or 828R, etc.), and the band-gap reference circuit 830 is coupled with a respective input port of the analog multiplexer circuit through a respective sample and hold circuit 834. Note that the analog multiplexer circuit 832P (or 832R, etc.) is bootstrapped to (1) provide random-access from the Hall-effect sensing elements to the parallel PGA circuits 836P, 836R, etc., and (2) reduce parasitic charge transfer in large (W/L) high-speed field-effect transistors (FETs). This multiplexer is functionally defined to have multiple inputs and multiple outputs, and routing between a specified input and a specified output is selected by a corresponding address input. In terms of circuit realization, such a multiplexer can be realized by a plurality of multiplexer modules 832P, 832R, etc., one for each of the programmable amplifiers 836P, 836R, etc. Each one of the multiplexer modules 832P, 832R, etc. will have only one output that feeds into one of the PGA/ADC channels 836P/840P, 836R/840R, etc. Each one of the sample and hold circuits 834 will feed into one of the inputs on one of these multiplexer modules 832P, 832R, etc. The address input for each multiplexer module 832P, 832R, etc. can be shared or individually addressed.

The PGA circuit 836P (or 836R, etc.) is coupled with the output port of the analog multiplexer circuit 832P (or 832R, etc.) Note that the S/H circuitry 834 also level shifts the Hall voltage output by each of the Hall-effect sensing elements to input common-mode (CM) level of the PGA circuit 836P (or 836R, etc.)

Offset and low-frequency noise of the PGA circuit 836P (or 836R, etc.) can be removed by chopping. As such, in some implementations, the mix-signal circuitry 820 further includes a pair of multiplexers 838P (or 838R, etc.), also referred to as a chopping multiplexer pair, that includes a first multiplexer coupled between the output port of the analog multiplexer circuit 832P (or 832R, etc.) and the input port of PGA circuit 836P (or 836R, etc.) and a second multiplexer coupled between the output port of the PGA circuit 836P (or 836R, etc.) and the input port of ADC circuit 840P (or 840R, etc.). When the pair of multiplexers 838P (or 838R, etc.) is switched simultaneously, the polarity of the input and output signals of the PGA circuit 836P (or 836R, etc.) is inverted. This action has no impact on the analog output of the multiplexer 832, but it inverts the sign of any offset or low-frequency noise from the PGA circuit 836P (or 836R, etc.) which can be canceled out later by addition or averaging.

Further, the ADC circuit 840P (or 840R, etc.) is coupled between the PGA circuit 836P (or 836R, etc.) and the DSP 822. Note that the multiple PGA circuit 836P (or 836R, etc.)

and ADC circuit 840P (or 840R, etc.) channels are being parallelized to increase sampling speed and relax analog design requirement.

The mix-signal circuitry 820 includes a DSP 822 coupled with the ADC circuits 840P, 840R, etc. Here, the DSP 822 can be implemented as a FPGA, or MCU, or any digital state-machine, for instance, and configured to perform any one of the techniques described above (e.g., processes 530, 550) for determining displacements $\Delta Z$, $\Delta X$ and $\Delta Y$ of the mass 154 based on changes of a magnetic field measured by the Hall-effect sensing elements included in the ASIC. The determined displacements $\Delta Z$, $\Delta X$ and $\Delta Y$ can be output to an off-chip computing system 842 for further processing, storing, etc.

Note that another advantage of the technologies described above is that only digital information is communicated between the DSP 822 and the off-chip computing system 842. This interface between the DSP 822 and the off-chip computing system 842 can be implemented using the pads 666 shown in FIG. 6 or the pads 766 shown in FIG. 7. In these examples, only a small number of pads is provided on IC chip 600 or 700 for high speed digital data transmission, which can save cost relative to some conventional implementations of magnetic field sensing systems in which an analog signal is output by each sensor to an off-chip computing system, such that a pair of pads needs to be provided for each sensor.

Note that the architecture of the mix-signal circuitry 820 relies on $\Delta B$ sensing which inherently cancels out a Hall voltage offset output by the Hall-effect sensing elements of the ASIC shown in FIG. 8. Low-frequency noise is minimized when a sampling speed is high enough to ensure time correlation between the two samples that generate $\Delta B$.

In summary, processes 530 and 550 can be used to encode one or more displacements $\Delta X$, $\Delta Y$, and $\Delta Z$ of a mass 154 of a haptic engine 150 in magnetic field intensity along one axis, e.g., $B_Z$ (or alternatively $B_X$ or $B_Y$), and measuring it via uniaxial Hall-effect sensing elements (or other uniaxial magnetic field sensing elements.) Self-calibration of mass 154's displacement can be performed by determining a gradient $\delta B_Z/\delta X$ based on the known distance, dn, between uniaxial Hall-effect sensing elements. Discriminating the displacements $\Delta X$, $\Delta Y$, and $\Delta Z$ during runtime can be performed by using (i) changes $\Delta B_Z$ measured by different combinations of uniaxial Hall-effect sensing elements with different separation distances, dn, and (ii) self-calibration data relating to the gradient $\delta B_Z/\delta X$ to solve for each motion component separately. Same processes can be used based on gradient $\delta B_X/\delta X$ or gradient $\delta B_Y/\delta X$.

Moreover, processes 530 and 550 can be used to encode one or more displacements $\Delta X$, $\Delta Y$, and $\Delta Z$ of a mass 154 of a haptic engine 150 in magnetic field angle ang(B), and measuring it via tri-axial Hall-effect sensing elements (or other tri-axial magnetic field sensing elements.) Self-calibration of mass 154's displacement can be performed by determining a gradient $\delta[\text{ang}(B)]/\delta X$ based on the known distance, dn, between tri-axial Hall-effect sensing elements. Discriminating the displacements $\Delta X$, $\Delta Y$, and $\Delta Z$ motion during runtime can be performed by using (i) changes $\Delta[\text{ang}(B)]$ measured by different combinations of tri-axial Hall-effect sensing elements with different separation distances, dn, and (ii) self-calibration data relating to the gradient $\delta[\text{ang}(B)]/\delta X$ to solve for each motion component separately.

Referring again to FIG. 1A, in other embodiments, the mixed signal circuitry 120 can be provided as a separate discrete chip located away from the array 110 of magnetic field sensing elements. In yet another embodiment, the array 110 of magnetic field sensing elements and the mixed-signal circuitry 120 can each be fabricated on separate chips and integrated onto a common base substrate, e.g., 101, as a system-in-package. The same implementations can be provided for the systems 600 and 700. Note that in each of the foregoing embodiments, the separation $d_1$ between the magnetic field sensing elements 110A and 110B (or 610A and 610B, or 710A and 710B) is different from the separation $d_2$ between the magnetic field sensing elements 110B and 110C (or 610B and 610C, or 710B and 710C).

Additionally, in some embodiments, the magnetic field sensing elements of the array 110 of IC chip 100 can also function as temperature sensors. For example, when the magnetic field sensing elements of the array 110 are implemented as Hall sensors, a change in resistance $\Delta\rho(\Delta\Theta)$ of each Hall sensor is a function of mostly a change in temperature $\Delta\Theta$, and a change in Hall voltage $\Delta V(\Delta B;\Delta\Theta)$ output by the Hall sensor is a function of both a change in magnetic field intensity $\Delta B$ and also a change in temperature $\Delta\Theta$. In this manner, a measurement of the change in resistance $\Delta\rho(\Delta\Theta)$ of a Hall sensor can be used to determine the change in temperature $\Delta\Theta$ of the Hall sensor, and a measurement of the change in Hall voltage $\Delta V(\Delta B;\Delta\Theta)$ output by the Hall sensor can be used to determine the change magnetic field intensity $\Delta B$ at the location of the Hall sensor for the determined change in temperature $\Delta\Theta$. As such, the temperature change $\Delta\Theta$ determined in this manner can be useful for improving the accuracy of $\Delta Z$ displacement and $\Delta X$ displacement measurements performed using the IC chip 100 when various temperature coefficients of the IC chip 100 are modeled and compensated for.

Figure 9:
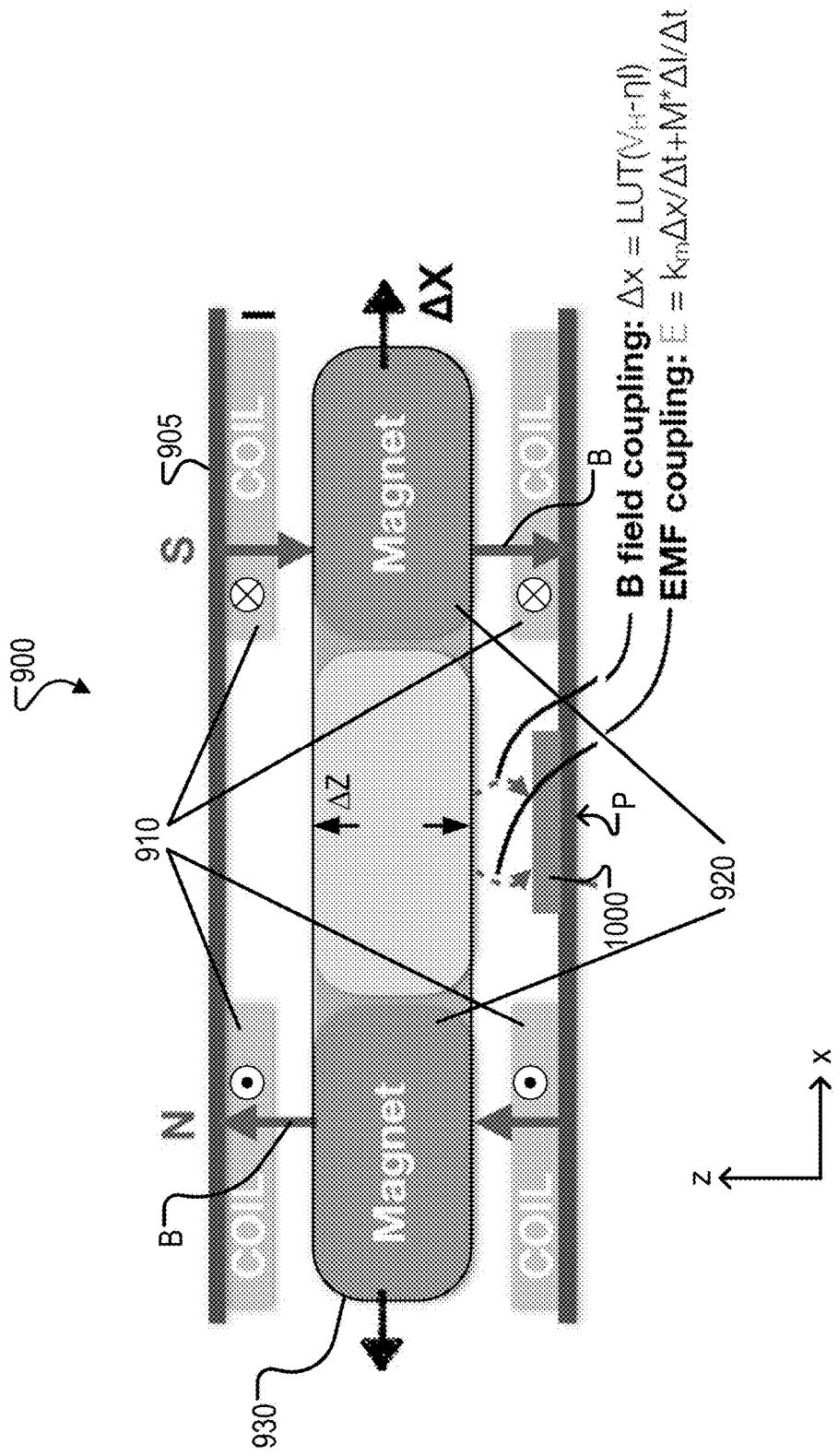
FIG. 9 shows an example of a haptic engine (HE) that includes a hybrid sensor for concurrently measuring Hall voltage and bEMF.

FIG. 9 shows a haptic engine (HE) 900 that includes a driving coil 910 and a magnet 920 that are movable relative to each other, and a hybrid sensor 1000 that is static relative one of the magnet or the driving coil. The hybrid sensor 1000 is used for sensing relative movement between the magnet 920 and the driving coil 910 via both bEMF and Hall voltage. In the example illustrated in FIG. 9, HE 900 has a frame 905 that encapsulates a mass 930 arranged and configured to move relative the frame, at least, along the x-axis (e.g., through vibration left-and-right on page), and optionally along the z-axis (e.g., through vibration up-and-down on page), or combinations of these motions. Here, the driving coil 910 is disposed on (i.e., are fixed to) the frame 905. In some implementations, sections of the driving coil 910 can be made from one winding (looped in and out of the page) and have continuous current flow. Further, the mass 930 is formed from a stainless cage with enclosures that hold portions of the magnet 920.

In the example illustrated in FIG. 9, a left portion of the magnet 920 is oriented with its north pole towards the top of the page and its south pole towards the bottom of the page, and a right portion of the magnet is oriented with its north pole towards the bottom of the page and its south pole towards the top of the page. Left sections of the driving coil 910 have the same electrical current flow (e.g., current I along the negative y-axis), while right sections of the driving coil have the opposite electrical current flow (e.g., current I along the positive y-axis). As such, the driving coil 910 experiences a Lorentz force to the left of the page and the magnet 920, along with the mass 930, will move towards the right of the page. In this manner, an alternating (i.e., driving) current I that is provided through the driving coil 910 causes a periodic Lorentz force that drives, along the x-axis, the mass 930 that includes the magnet 920. An amplitude and frequency of the displacement ΔX of the mass 930 is proportional to respective amplitude and frequency of the driving current I.

The driving coil 910 and the magnet 920 are configured and arranged relative to each other, such that, when the mass 930 is at rest, a combination of the driving coil and the magnet emits a magnetic field B. Only two lines of a spatial distribution of the magnetic field B(X,Y,Z) emitted by the combination of driving coil and magnet is shown in FIG. 9. Moreover, the hybrid sensor 1000 is disposed on (i.e., it is "affixed" to) the frame 905 of HE 900 at a "sensing point" P of the spatial distribution of the magnetic field B(X,Y,Z) emitted by the combination of driving coil 910 and magnet 920. In this manner, hybrid sensor 1000 can determine a magnitude of the magnetic field B and its time dependence, at the sensing point P, as described below.

Figure 10:
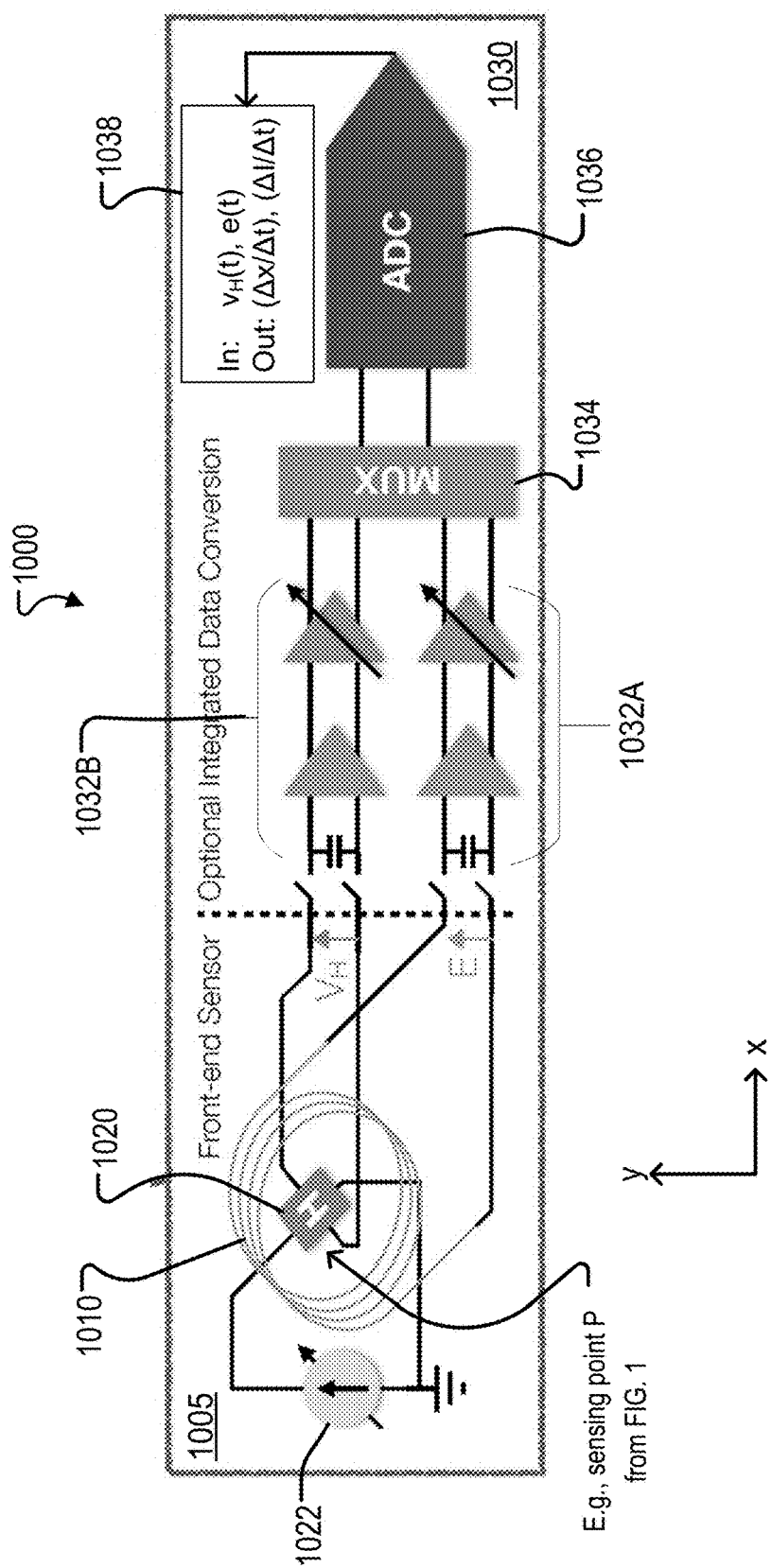
FIG. 10 shows an example of a hybrid sensor including a HES and a sensing coil for concurrently measuring Hall voltage and bEMF.
Figure 11A:
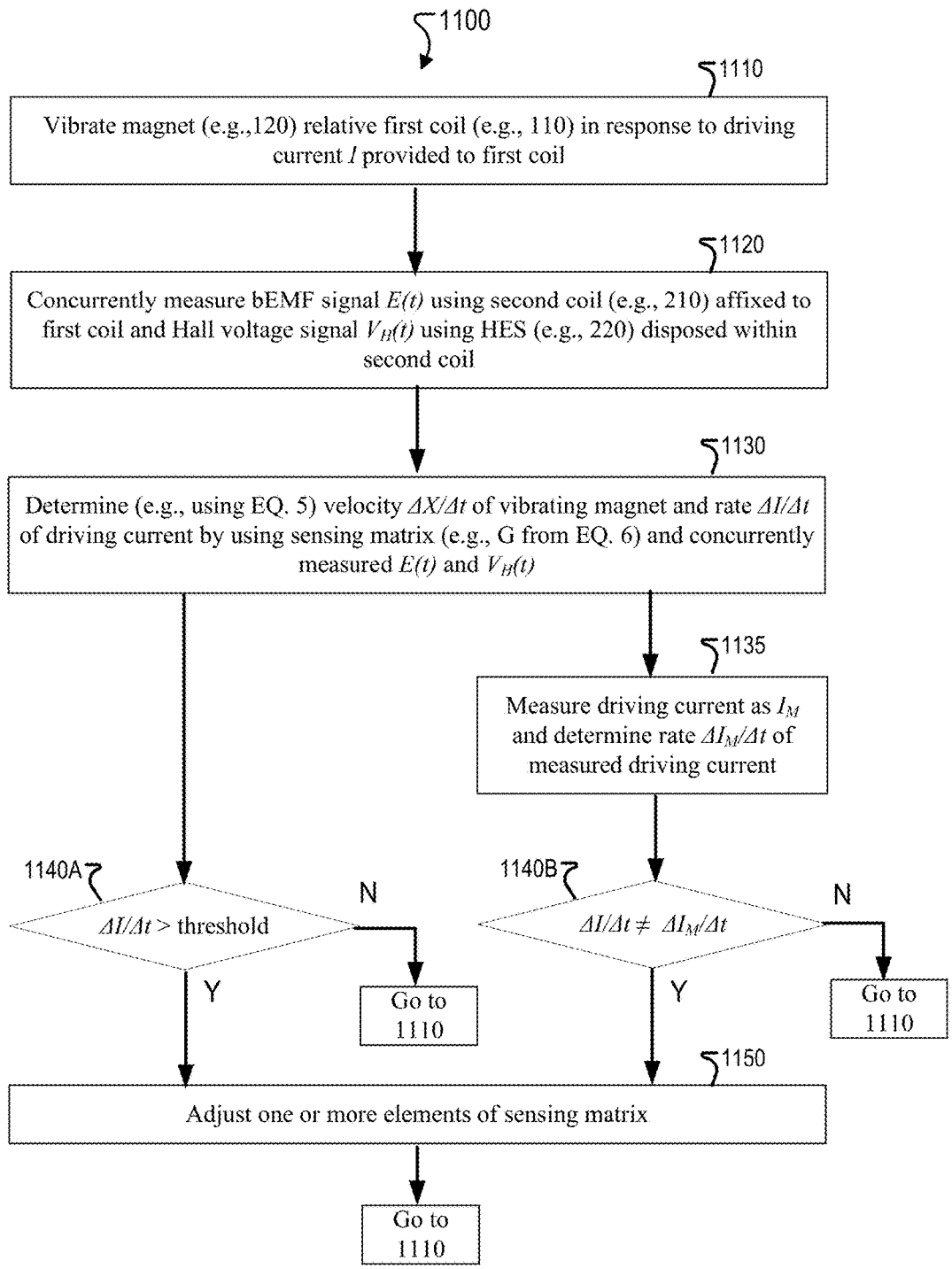
FIGS. 11A-11C show aspects of a measurement technique for concurrently measuring Hall voltage and bEMF.
Figures 11B, 11C:
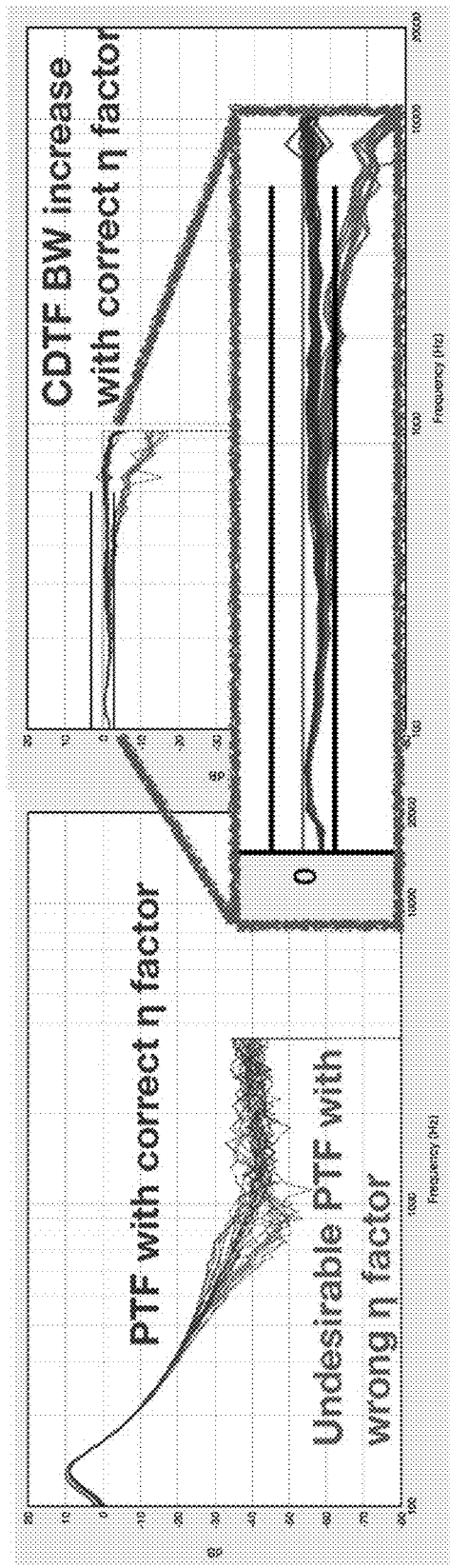
Figure 12A:
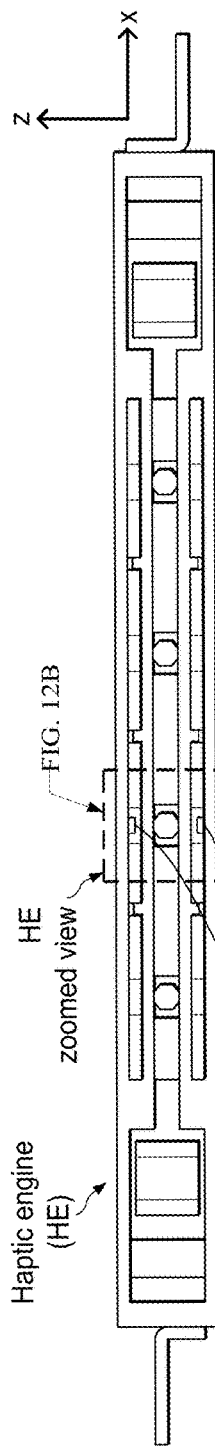
FIGS. 12A-12D show aspects of displacement sensing using a conventional HE.
Figure 12B:
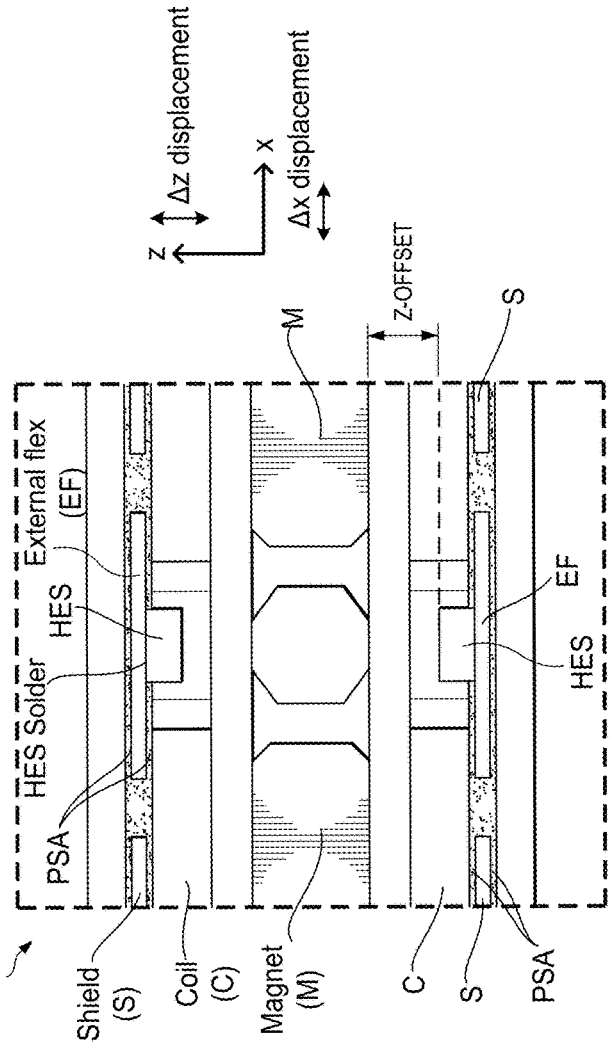
Figure 12C:
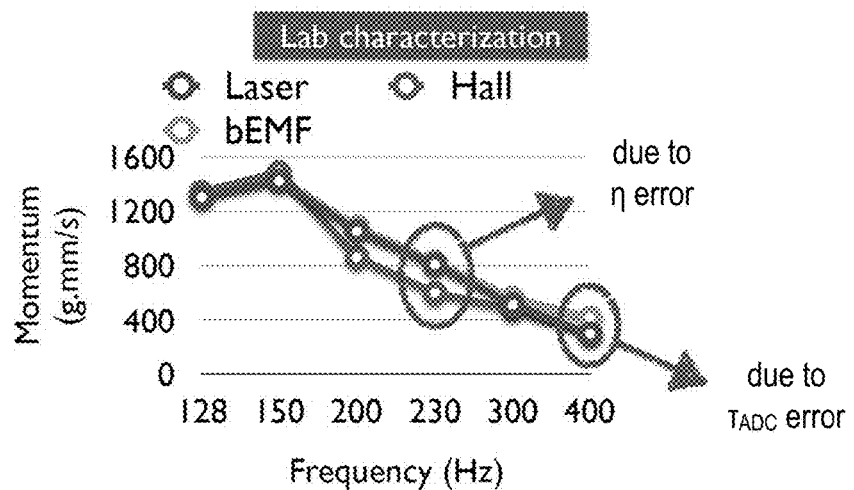
Figure 12D:
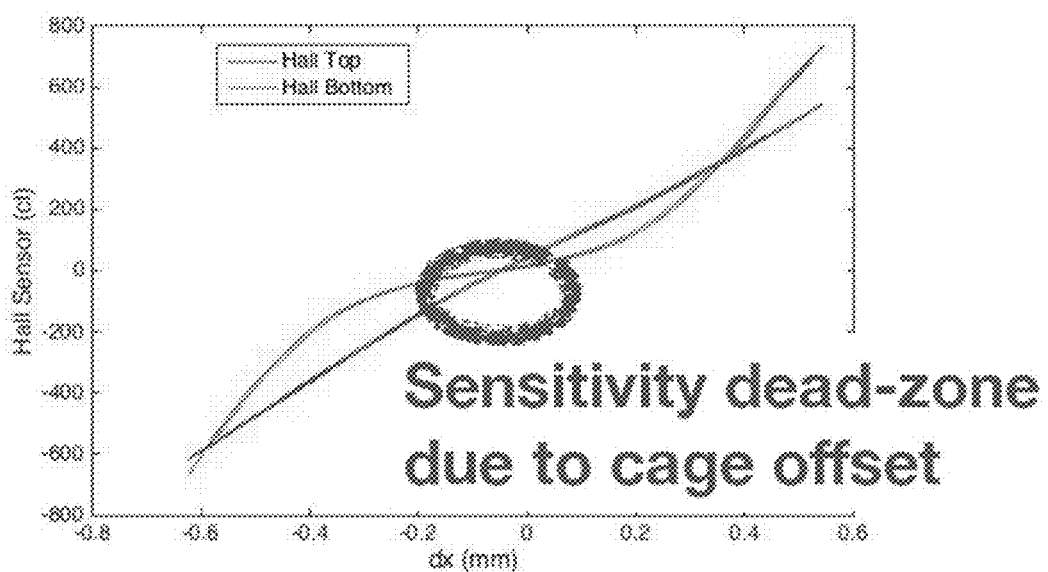

FIG. 10 shows an example implementation of the hybrid sensor 1000 that includes analog front-end circuitry 1005. Here, the analog front-end circuitry 1005 includes a coil structure 1010 (also referred to as sensing coil) and a Hall sensing element (HES) 1020. Both the coil structure 1010 and the HES 1020 can be fabricated using various semiconductor technologies (e.g., CMOS technologies, etc.) Optionally, the hybrid sensor 1000 can include, in addition to the analog front-end circuitry 1005, data conversion circuitry 1030. Such integration of the analog front-end circuitry 1005 with the data conversion circuitry 1030 can reduce signal path mismatch (non-linearity, timing, frequency response, gain, etc.) resulting in improved measurement accuracy when the hybrid sensor 1000 is used in HE 900 for measuring the displacement ΔX of mass 930. In this manner, HE 900 suitably has a digital-in interface (e.g., implemented as a source of PWM input signals for activating the driving coil 910), and a digital-out interface (e.g., implemented as the data conversion circuitry 1030 of the hybrid sensor 1000), both of which are universal across module and system testers, making the tester code simpler and less error prone.

The sensing coil 1010 of the analog front-end circuitry 1005 is arranged and configured to sense flux change ΔB/Δt, at the location of the sensing coil, as induced bEMF across the sensing coil. For example, when the hybrid sensor 1000 is disposed inside HE 900 at sensing point P, as shown in FIG. 9, the sensing coil 1010 senses flux change ΔB/Δt, at the sensing point P, due to a rate of change ΔX/Δt in the displacement (i.e., the velocity) of the mass 930. Note that while a current $I_S$ is being induced by the flux change ΔB/Δt in the sensing coil 1010, no current is driven there through. As such, the sensing coil 1010 outputs the induced bEMF's value as a voltage value E. The velocity ΔX/Δt of the mass 930 is obtained from $$E = K_M \frac{\Delta X}{\Delta t} + M \frac{\Delta I}{\Delta t}, \quad (17)$$

where ΔI/Δt is a change in the driving current through the driving coil 910, M (measured in Henrys) is a mutual coupling between the driving coil 910 and the sensing coil 1010, and $K_M$ (measured in N/A) is a motor constant.

Additionally, the HES 1020 of the hybrid sensor 1000 is arranged and configured to sense absolute field intensity B, at the location of the HES, as a Hall voltage $V_H$ output by the HES. For example, when the hybrid sensor 1000 is disposed inside HE 900 at sensing point P, as shown in FIG. 9, the HES 1020 senses the field intensity B, at the sensing point P, due to a displacement ΔX of mass 930.

Note that in the example illustrated in FIG. 10, the sensing coil 1010 and the magnetic sensor 1020 of the analog front-end circuitry 1005 are disposed at a common location, e.g. the sensing point P of HE 900, such that the hybrid sensor 1000 can concurrently sense the absolute field intensity B (via Hall voltage measurements) and its rate of change ΔB/Δt (via bEMF measurements), at the common location. In this manner, for HE 900, the velocity ΔX/Δt of the magnet-carrying mass 930 relative the frame 905, on which the hybrid sensor 1000 is disposed, can be sensed via both bEMF and Hall voltage measurements performed concurrently to, but independently from, each other. Beneficially, by sensing movement of the magnet-carrying mass 930 relative the frame 905 via both bEMF signal and Hall voltage signal, the above noted EM coupling factor η-accuracy errors and the errors caused by non-zero ADC delay $\tau_{ADC}$ can be concurrently addressed. Further note that the bEMF measurements are not prone to errors in coil resistance because virtually no current flows in the sensing coil 1010.

Lateral size of each of the sensing coil 1010 and the HES 1020 is of order tens to hundreds of microns. As the HES 1020 is disposed "inside" the sensing coil 1010, the lateral size of the former can be 90%, 80%, 50%, 20% or 10% smaller than the lateral size of the latter. In some implementations, the HES 1020 can be disposed, in regard to the (x,y) plane, at the center of the sensing coil 1010. Moreover, note that in implementations in which at least some portions of the hybrid sensor 1000 are formed using CMOS technologies, components and routing of the analog front-end circuitry 1005 can be built vertically, e.g., along the z-axis, by using a planer multi-level fabrication process. In some such implementations, the HES 1020 can be formed in the same layer as the sensing coil 1010, i.e., in the same (x,y) plane. In other such implementations, the HES 1020 can be formed in a first layer parallel to the (x,y) plane and the sensing coil 1010 can be formed in a second layer parallel to the (x,y) plane that is higher along the z-axis in the stack-up than the first layer. In some cases, the second layer in which the sensing coil 1010 has been formed can be deposited prior to the first layer in which the HES 1020 has been formed, so the second layer is lower along the z-axis in the stack-up.

In the example illustrated in FIG. 10, the data conversion circuit 1030 of the hybrid sensor 1000 includes pre-amplifier circuits 1032A, 1032B (also referred to as signal conditioning circuits) respectively coupled with the sensing coil 1010 and the HES 1020, a multiplexer (MUX) 1034 coupled with the pre-amplifier circuits, and an analog-to-digital converter (ADC) 1036 coupled with the MUX. Optionally, the data conversion circuit 1030 includes a processing module 1038 coupled with the ADC.

The pre-amplifier circuits 1032A, 1032B are arranged and configured to receive, filter and amplify the analog bEMF signal E(t) across the sensing coil 1010 and the analog Hall voltage signal $V_H(t)$ across the HES 1020. The ADC 1036 is configured to digitize the analog bEMF signal E(t) and the analog Hall voltage signal $V_H(t)$ received through the MUX 1034, and to provide digitized bEMF signal e (t) and the digitized Hall voltage signal $v_H(t)$ to the processing module 1038.

When the hybrid sensor 1000 is used in HE 900, the processing module 1038 is configured to determine the velocity ΔX/Δt and displacement ΔX of the magnet-carrying mass 930 relative the frame 905 from the digitized bEMF voltage signal e(t) and the Hall voltage signal $v_H(t)$. Note that in some implementations, the processing module 1038 is part of a digital signal processor (DSP) that is remote from the hybrid sensor 1000. In such cases, the digitized bEMF signal e(t) and the digitized Hall voltage signal $v_H(t)$ are transmitted from the hybrid sensor 1000 to the DSP through communication channels.

For example, the processing module 1038 is configured to determine the speed $\Delta X/\Delta t$ of the magnet-carrying mass 930 relative the frame 905 of HE 900 based on values of the simultaneously measured bEMF signal e(t) and Hall voltage signal $v_H(t)$ in accordance with $$\begin{bmatrix} \frac{\Delta X}{\Delta t} \\ \frac{\Delta I}{\Delta t} \end{bmatrix} = G^{-1} \begin{bmatrix} e(t) \\ \frac{\Delta v_H(t)}{\Delta t} \end{bmatrix}. \quad (18)$$

The sensing matrix G from EQ. (18) is expressed as $$G = \begin{bmatrix} K_M & M \\ S_H \frac{\delta B(X)}{\delta X} & \eta \end{bmatrix}, \quad (19)$$

where matrix element $K_M$ and matrix element M are provided in terms of EQ. (17), and matrix element $\eta$ is provided in terms of EQ. (3). Additionally, matrix element $$S_H \frac{\delta B(X)}{\delta X}$$

represents a field sensitivity obtained from the LUT referenced in EQ. (3). This matrix element, also referred to as the LUT element, is expressed in units of Hall counts per micrometer. The factor $$\frac{\delta B(X)}{\delta X}$$

describes a gradient of field intensity B(X) along the x-axis, and encompasses all the nonlinearities of the field intensity. The factor $S_H$ is the Hall sensitivity, expressed in units of mT/count. The LUT element can be obtained in simulation or calibrated by bEMF model fitting. In fact, values of all the elements of sensing matrix G can be are obtained during an initial calibration of the hybrid sensor 1000, e.g., in the factory. For example, the motor constant $K_M$ can be calibrated by measuring the bEMF around RE's resonance frequency for a known mass of HE. The EM coupling factor $\eta$ can be calibrated by measuring Hall voltage of HES 1020 when driving high-frequency currents (e.g. 2 kHz) through the driving coil 910. Similarly, the mutual coupling M can be determined at the same time when driving high-frequency currents (e.g. 2 kHz) through the driving coil 910 and measuring the induced voltage across the sensing coil 1010. The foregoing measured values are the "t=0 values" of the elements of the sensing matrix G.

Moreover, the displacement $\Delta X$ of the magnet-carrying mass 930 relative the frame 905 can be calculated from its velocity $\Delta X/\Delta t$ determined from EQs. (18)-(19). For instance, the determined velocity $\Delta X/\Delta t$ can be integrated to obtain the displacement $\Delta X$.

Note that, by solving EQ. 18 based on the concurrently measured signals e(t) and $v_H(t)$, the processing module 1038 determines not only the velocity $\Delta X/\Delta t$ of the magnet-carrying mass 930 relative the frame 905 of HE 900, but also a rate $\Delta I/\Delta t$ of the driving current through the driving coil 910 of HE 900. As such, while actuating HE 900, i.e., as the magnet-carrying mass 930 is vibrated relative to the hybrid sensor 1000 that is affixed to the frame 905, in the vicinity of a resonant frequency, $\Delta I/\Delta t$ exhibits a resonant current-rate value, and $\Delta X/\Delta t$ exhibits a resonant velocity value; whereas, away from the resonant frequency, $\Delta I/\Delta t$ exhibits a non-resonant current-rate value larger than the resonant current-rate value, while $\Delta X/\Delta t$ exhibits a non-resonant velocity value smaller than the resonant velocity value. As the elements of the sensing matrix G are considered to be parameters that have constant values in time, for bEMF measurements performed in accordance with EQ. (17), the first term will carry a larger weight than the second term near a resonant frequency, and the second term will carry a larger weight that the first term away from the resonant frequency.

During operation of HE 900, the driving current I through the driving coil 910 can also be measured, as $I_M(t)$, in addition to the bEMF E(t) signal and the Hall voltage $V_H(t)$ signal. In this manner, EQs. (18)-(19) are used first by the processing module 1038 to determine the rate $\Delta I/\Delta t$ of the driving current through the driving coil 910 based on the concurrently measured the bEMF E(t) signal and the Hall voltage $V_H(t)$ signal. Moreover, $\Delta I/\Delta t$ determined from EQs. (18)-(19) can be compared with $\Delta I_M/\Delta t$ determined by differentiating the measured driving current $I_M$. If the determined $\Delta I/\Delta t$ is different from the measured $\Delta I_M/\Delta t$ by more than a threshold value, it is assumed that one or more of the values of the elements of the sensing matrix G (e.g., most likely, M, or $$S_H \frac{\delta B(X)}{\delta X})$$

have changed. As the values of the elements of the sensing matrix G can, and typically do slowly, vary in time, a filter can be applied to the sensing matrix G to implement a running average of the matrix element values.

FIG. 3A is a flow chart a process 300 that summarizes the techniques described above for measuring velocity $\Delta X/\Delta t$ of the magnet-carrying mass 930 of HE 900 using the hybrid sensor 1000. As shown in FIG. 9, the hybrid sensor 1000 is affixed to the frame 905 of HE 900 and, thus, it at rest with respect to the driving coil 910.

At 310, the magnet-carrying mass 930 is vibrated relative the driving coil 910 in response to driving a current I through the driving coil.

At 320, a bEMF signal E(t) and a Hall voltage signal $V_H(t)$ are concurrently measured using, respectively, the sensing coil 1010 of the hybrid sensor 1000 and the HES 1020 of the hybrid sensor. As shown in FIG. 10, the HES 1020 is disposed within the sensing coil 1010.

At 330, a velocity $\Delta X/\Delta t$ of the vibrating magnet-carrying mass 930 and a rate $\Delta I/\Delta t$ of the driving current through the driving coil 910 are determined by the processing module 1038. This determination is performed using EQs. (18)-(19) based on the concurrently measured bEMF signal E(t) and Hall voltage signal $V_H(t)$.

In some implementations, at 340A, the processing module 1038 can verify whether the rate $\Delta I/\Delta t$ of the driving current, as determined at 330, exceeds a threshold.

In some implementations, at 335, the driving current I through the driving coil 910 can be measured directly and concurrently with the measuring of the bEMF signal E(t) and Hall voltage signal $V_H(t)$. Here, the measured driving current $I_M$ is differentiated to determine a rate $\Delta I_M/\Delta t$ of the measured driving current. At 340B, the processing module 1038 can verify whether the rate $\Delta I/\Delta t$ of the driving current, as determined at 330, is different from the rate $\Delta I_M/\Delta t$ of the measured driving current, as determined at 335. For instance, $\Delta I/\Delta t$ is deemed to be different from $\Delta I_M/\Delta t$ if $$\text{rms}\left(\left(\frac{\Delta I}{\Delta t}\right) - \left(\frac{\Delta I_M}{\Delta t}\right)\right)$$

is larger than a threshold.

If the verification performed at either 340A or 340B is false, then the process 300 can be reiterated. However, if the verification performed at either 340A or 340B is true, then, at 350, the processing module 1038 can adjust one or more elements of the sensing matrix G, given by EQ. (19), prior to potentially reiterating the process 300. For instance, adjustment of the EM coupling factor η can cause improvement in the sensing of the velocity $\Delta X/\Delta t$ of the vibrating magnet-carrying mass 930, as illustrated in the simulation results presented in FIGS. 3B-3C. As described above, the adjusting can be performed by applying a filter on the one or more elements of the sensing matrix G, starting from respective factory-calibrated values of these elements. In some implementations, the application of the filter involves performing a running average of the one or more elements of the sensing matrix G.

Referring again to FIGS. 9-10, as the bEMF is measured on the sensing coil 1010 of the hybrid sensor 1000 and not on the driving coil 910 of HE 900, errors caused by variations in the driving coil's resistance can be reduced/avoided. While actuating HE 900, variations of order 0.48%/deg in the driving coil 910's resistance can occur over changes in temperature of order 30°, thus rendering bEMF measurements, that use the driving coil for sensing magnetic field variations $\Delta B/\Delta t$, inaccurate. However, when the sensing coil 1010 of analog front-end circuitry 1005 is used for sensing magnetic field variations $\Delta B/\Delta t$, the resistance of the sensing coil stays substantially constant when the HE 900's temperature changes, because there is no active (driving) current, but only a small sensing current, that circulates through the sensing coil.

Moreover, HES 1020's resistance can be used as a temperature sensor for thermal compensation of the sensing coil 1010's resistance value and Hall voltage's value $V_H$ measured over the HES. For instance, in the example shown in FIG. 10, a current source 1022 can be used to induce a desired current through HES 1020 between its pair of terminals that are not used for measuring Hall voltage. In this manner, a measurement of the voltage across this pair of terminals is used to determine the resistance of HES 1020. For example, a change in resistance $\Delta\rho(\Delta\Theta)$ of HES 1020 is a function of mostly a change in temperature $\Delta\Theta$, and a change in Hall voltage $\Delta V_H(\Delta B; \Delta\Theta)$ output by HES is a function of both a change in magnetic field intensity $\Delta B$ and also a change in temperature $\Delta\Theta$. In this manner, a measurement of the change in resistance $\Delta\rho(\Delta\Theta)$ of HES 1020 can be used to determine the change in temperature $\Delta\Theta$ of HES, and a measurement of the change in Hall voltage $\Delta V_H(\Delta B; \Delta\Theta)$ output by HES can be used to determine the change magnetic field intensity $\Delta B$ at the location of HES for the determined change in temperature $\Delta\Theta$. As such, the temperature change $\Delta\Theta$ determined in this manner can be useful for improving the accuracy of $\Delta X$ displacement measurements performed using the hybrid sensor 1000 when various temperature coefficients of the sensing coil 1010 and HES are modeled and compensated for.

Note that the analog bEMF signal E(t) across the sensing coil 1010 and the analog Hall voltage signal $V_H(t)$ across the HES 1020 are out of phase by 90° (the former signal being proportional to the velocity $\Delta X/\Delta t$ of mass 930 and the latter being proportional to the displacement $\Delta X$ of the mass). In this manner, a finite (non-zero) signal is always output by the analog front-end circuitry 1005 to the data conversion circuitry 1030, and, hence, an rms of a combination of the digitized bEMF signal e(t) and the digitized Hall voltage signal $v_H(t)$ is always non-zero. As such, in some implementations, a pair of hybrid sensors 1000 can be used in HE 900, so the pair of hybrid sensors sandwiches, along the Z-axis, the moving magnet-carrying mass 930. In this manner, a displacement $\Delta Z$ along the Z-axis of the magnet-carrying mass 930 can be determined as $$\Delta Z \propto \frac{(V_{rms_t} - V_{rms_b})}{(V_{rms_t} + V_{rms_b})}, \tag{20}$$

where the rms of the digital outputs of the hybrid sensors disposed respectively above and below the magnet-carrying mass 930 are $$V_{rms_t} = \sqrt{E_t^2 + V_{H_t}^2} \neq 0 \tag{21},$$

$$V_{rms_b} = \sqrt{E_b^2 + V_{H_b}^2} \neq 0 \tag{22}.$$

Because both terms in the denominator of EQ. (20) are non-zero, in accordance with EQs. (21)-(22), the displacement $\Delta Z$ along the Z-axis can be accurately determined.

In other implementations, a plurality of hybrid sensors 1000 can be arranged inside HE 900 to form a 1D-array, e.g., to form a row of hybrid sensors. In yet other implementations, a plurality of hybrid sensors 1000 can be arranged inside HE 900 to form 2D-array, e.g., a rectangular array of hybrid sensors 1000 arranged in rows and columns. This arrangement of the plurality of hybrid sensors 1000 can be referred to as a "magnetic camera." In either of these implementations, each of the plurality of hybrid sensors 1000 of the array is operated independently from each other to sense the absolute field intensity B and its rate of change $\Delta B/\Delta t$, at its associated node P(i,j) of the array, where i is a row index and j is a column index.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including system on chip (SoC) implementations, which can include one or more controllers and embedded code.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An integrated circuit (IC) chip comprising:
   a first magnetic field sensing element disposed at a first location of the IC chip;
   a second magnetic field sensing element disposed at a second location of the IC chip; and
   a third magnetic field sensing element disposed at a third location of the IC chip, the first location, the second location and the third location being distributed along a first direction, such that the second location is between the first location and the third location, and the second location is separated from the first location by a first distance and from the third location by a second distance different from the first distance; and
   signal processing circuit configured to determine displacements of a mass, when the mass is in motion along a direction of motion having a first component along the first direction and a second component along a second direction normal to the IC chip, wherein the mass supports at least a portion of a magnetic field source, wherein the displacements of the mass are determined, at least in part, based on location-specific changes of a magnetic field emitted by the magnetic field source, the magnetic field changes being caused by the motion of the mass.

2. The IC chip of claim 1, wherein the location specific magnetic field changes comprise magnetic field changes sensed at the first location by the first magnetic field sensing element, magnetic field changes sensed at the second location by the second magnetic field sensing element, and magnetic field changes sensed at the third location by the third magnetic field sensing element.

3. The IC chip of claim 1, wherein the signal processing circuit is disposed in an area of the IC chip that is between the second location and third location along the first direction, and the second distance is larger than the first distance.

4. The IC chip of claim 1, wherein the determined displacements of the mass include a displacement along the first direction and a displacement along the second direction.

5. The IC chip of claim 4, wherein each of the first, second and third magnetic field sensing elements is configured to sense components of the magnetic field along each of the first direction, the second direction and a third direction orthogonal on both the first direction and the second direction, and provide to the signal processing circuit an angle of the magnetic field relative to the second direction and a magnitude of the magnetic field.

6. The IC chip of claim 5, wherein each of the first, second and third magnetic field sensing elements comprises a tri-axial Hall-effect sensor element.

7. The IC chip of claim 4, further comprising:
   a fourth magnetic field sensing element disposed at a fourth location of the IC chip, the fourth location being separated from the first location by a third distance along a third direction orthogonal on both the first direction and the second direction,
   wherein the direction of motion has a third component along the third direction, and
   wherein the determined displacements of the mass further include a displacement $\Delta Y$ along the third direction.

8. The IC chip of claim 7, further comprising:
   a fifth magnetic field sensing element disposed at a fifth location of the IC chip, the fifth location being separated from the third location by the third distance along the third direction and from the fourth location by a sum of the first distance and second distance along the first direction.

9. The IC chip of claim 8, further comprising:
   a sixth magnetic field sensing element disposed at a sixth location of the IC chip, the sixth location being (i) between the fourth location and the fifth location, (ii) separated from the fourth location by the first distance along the first direction, and (iii) separated from the second location by the third distance along the third direction;
   a seventh magnetic field sensing element disposed at a seventh location of the IC chip, such that the third location is between the second location and the seventh location, where the seventh location is separated from the third location by the first distance along the first direction; and
   an eighth magnetic field sensing element disposed at an eighth location of the IC chip such that the fifth location is between the sixth location and the eighth location, where the eighth location is separated from the fifth location by the first distance along the first direction, and separated from the seventh location by the third distance along the third direction,
   wherein the magnetic field sensing elements provide to the signal processing circuit a gradient along the first direction of the gradient along the first direction of the magnetic field.

10. The IC chip of claim 4, wherein each of the first, second and third magnetic field sensing elements is configured to sense a component of the magnetic field along the second direction.

11. The IC chip of claim 10, wherein each of the first, second and third magnetic field sensing elements comprises a uniaxial Hall-effect sensor element.

12. The IC chip of claim 1, comprising one or more driving circuits each of which comprises: a programmable current source; two or more of the magnetic field sensing elements; and a dummy load connected to each other in series.

13. The IC chip of claim 12, further comprising:
   a band-gap reference circuit;
   sample and hold circuits; and
   for each of the driving circuits,
      a multiplexer circuit comprising input ports and an output port, wherein an output of each of the magnetic field sensing elements, the dummies and the band-gap reference circuit is coupled with a respective input port of the multiplexer through a respective sample and hold circuit;

a programmable gain amplifier circuit coupled with the output port of the multiplexer circuit; and an analog to digital converter (ADC) circuit coupled between the programmable gain amplifier circuit and the signal processing circuit.

14. The IC chip of claim 13, further comprising a chopping multiplexer pair coupled between the output port of the multiplexer circuit and the input of the programmable gain amplifier circuit and between the output of the programmable gain amplifier circuit and the input of the ADC circuit.

15. The IC chip of claim 13, wherein the signal processing circuit and one or more of the dummy loads, the band-gap reference circuit, sample and hold circuits, multiplexer circuits, programmable gain amplifier circuits and ADCs are disposed in a central area of the IC chip that is between the second location and third location along the first direction, and the second distance is larger than the first distance.

16. The IC chip of claim 1, wherein the signal processing circuit to determine, when the mass is at rest, a gradient of the magnetic field along the first direction based on (i) a value of the magnetic field sensed by the first magnetic field sensing element at the first location, (ii) a value of the magnetic field sensed by the second magnetic field sensing element at the second location, and (iii) the first distance between the first location and the second location, and the displacements of the mass are determined based on a combination of the location-specific changes of the magnetic field and the gradient of the magnetic field along the first direction.

17. The IC chip of claim 1, wherein the IC chip is an application specific IC (ASIC).

18. A haptic engine comprising the mass and the IC chip recited in claim 1.

19. A computing device comprising the haptic engine of claim 18.

20. The IC chip of claim 1, wherein the signal processing circuit comprises a microcontroller unit.

21. The IC chip of claim 1, wherein the signal processing circuit comprises a Field-Programmable Gate Array.

22. The IC chip of claim 1, wherein the second distance is larger than the first distance by a predetermined factor in a range of 1.1 to 10.

* * * * *